US012605724B2

(12) United States Patent
Tromm et al.

(10) Patent No.: US 12,605,724 B2
(45) Date of Patent: Apr. 21, 2026

(54) SHOWER SYSTEM

(71) Applicant: Fortune Brands Water Innovations LLC, North Olmsted, OH (US)

(72) Inventors: Charles J. Tromm, Olmsted Township, OH (US); Christopher Douglas Dodd, Lakewood, OH (US); Thomas Joseph Manion, Broadview Heights, OH (US); Adam John Valco, Bay Village, OH (US)

(73) Assignee: Fortune Brands Water Innovations LLC, Deerfield, IL (US)

( * ) Notice: Subject to any disclaimer, the term of this patent is extended or adjusted under 35 U.S.C. 154(b) by 375 days.

(21) Appl. No.: 18/175,161

(22) Filed: Feb. 27, 2023

(65) Prior Publication Data

US 2023/0285991 A1 Sep. 14, 2023

Related U.S. Application Data

(60) Provisional application No. 63/315,780, filed on Mar. 2, 2022.

(51) Int. Cl.
*B05B 1/18* (2006.01)
*B05B 15/654* (2018.01)

(52) U.S. Cl.
CPC ............ *B05B 1/185* (2013.01); *B05B 15/654* (2018.02)

(58) Field of Classification Search
CPC ...... B05B 1/185; B05B 15/654; B05B 15/652
See application file for complete search history.

(56) References Cited

U.S. PATENT DOCUMENTS

| | | | | |
|---|---|---|---|---|
| 9,671,051 | B2 | 6/2017 | Frick | |
| 9,919,331 | B2 | 3/2018 | Scheffer et al. | |
| 2004/0217196 | A1* | 11/2004 | Yurek, Jr. | E03C 1/0408 239/289 |
| 2016/0237663 | A1* | 8/2016 | Myers | E03C 1/0404 |
| 2017/0050197 | A1 | 2/2017 | Huffington et al. | |
| 2022/0297151 | A1 | 9/2022 | Brown et al. | |

* cited by examiner

*Primary Examiner* — Qingzhang Zhou
(74) *Attorney, Agent, or Firm* — Calfee, Halter & Griswold LLP

(57) ABSTRACT

The present invention provides a shower system that enables a shower device to be easily removed from a dock. The shower system comprises a dock, a shower device, and a locking mechanism. The dock includes a water supply connector, a dock housing, and a dock connector. The dock connector includes a dock fluidic connector. The dock fluidic connector includes a dock fluid passageway. The shower device includes a shower device housing and a shower device connector. The shower device connector includes a shower device fluidic connector. The shower device fluidic connector includes a shower device fluid passageway. The water supply connector is operable to sealingly engage a water supply pipe. The shower device fluidic connector is operable to sealingly engage the dock fluidic connector and enable fluid to flow from the dock fluid passageway to the shower device fluid passageway. The locking mechanism is operable to removably retain the shower device fluidic connector in sealing engagement with the dock fluidic connector.

20 Claims, 28 Drawing Sheets

SHOWER SYSTEM

CROSS-REFERENCE TO RELATED APPLICATION

This application claims the benefit of U.S. Provisional Application No. 63/315,780, filed Mar. 2, 2022, the entire disclosure of which is hereby incorporated by reference.

FIELD

The present invention relates generally to a shower system and, more particularly, to a shower system that enables a shower device to be easily removed from a dock.

BACKGROUND

Shower devices need to be connected to a plumbing system. Typical shower devices are not easily removed once they are connected to a plumbing system. As a result, removal of shower devices, such as for cleaning or replacement, is difficult. A shower system that enables a shower device to be easily removed from a dock is desired.

SUMMARY

The present invention provides a shower system that enables a shower device to be easily removed from a dock.

In an exemplary embodiment, the shower system comprises a dock, a shower device, and a locking mechanism. The dock includes a water supply connector, a dock housing, and a dock connector. The dock connector includes a dock fluidic connector. The dock fluidic connector includes a dock fluid passageway. The shower device includes a shower device housing and a shower device connector. The shower device connector includes a shower device fluidic connector. The shower device fluidic connector includes a shower device fluid passageway. The water supply connector is operable to sealingly engage a water supply pipe. The shower device fluidic connector is operable to sealingly engage the dock fluidic connector and enable fluid to flow from the dock fluid passageway to the shower device fluid passageway. The locking mechanism is operable to removably retain the shower device fluidic connector in sealing engagement with the dock fluidic connector.

In an exemplary embodiment, the shower system comprises a dock, a shower device, and a locking mechanism. The dock includes a water supply connector, a dock housing, and a dock connector. The dock connector includes a dock fluidic connector and a dock magnetic mechanism. The shower device includes a shower device housing and a shower device connector. The shower device connector includes a shower device fluidic connector and a shower magnetic mechanism. The water supply connector is operable to sealingly engage a water supply pipe. The shower device fluidic connector is operable to sealingly engage the dock fluidic connector and enable fluid to flow from the dock fluid passageway to the shower device fluid passageway. The shower device magnetic mechanism is operable to interact with the dock magnetic mechanism. The locking mechanism is operable to removably retain the shower device fluidic connector in sealing engagement with the dock fluidic connector.

In an exemplary embodiment, the shower system comprises a dock, a shower device, and a locking mechanism. The dock includes a water supply connector, a dock housing, and a dock connector. The dock connector includes a dock fluidic connector and a dock alignment mechanism. The shower device includes a shower device housing and a shower device connector. The shower device connector includes a shower device fluidic connector and a shower alignment mechanism. The water supply connector is operable to sealingly engage a water supply pipe. The shower device fluidic connector is operable to sealingly engage the dock fluidic connector and enable fluid to flow from the dock fluid passageway to the shower device fluid passageway. The shower device alignment mechanism is operable to engage with the dock alignment mechanism. The locking mechanism is operable to removably retain the shower device fluidic connector in sealing engagement with the dock fluidic connector.

DETAILED DESCRIPTION

The present invention provides a shower system that enables a shower device to be easily removed from a dock.

Figure 1:
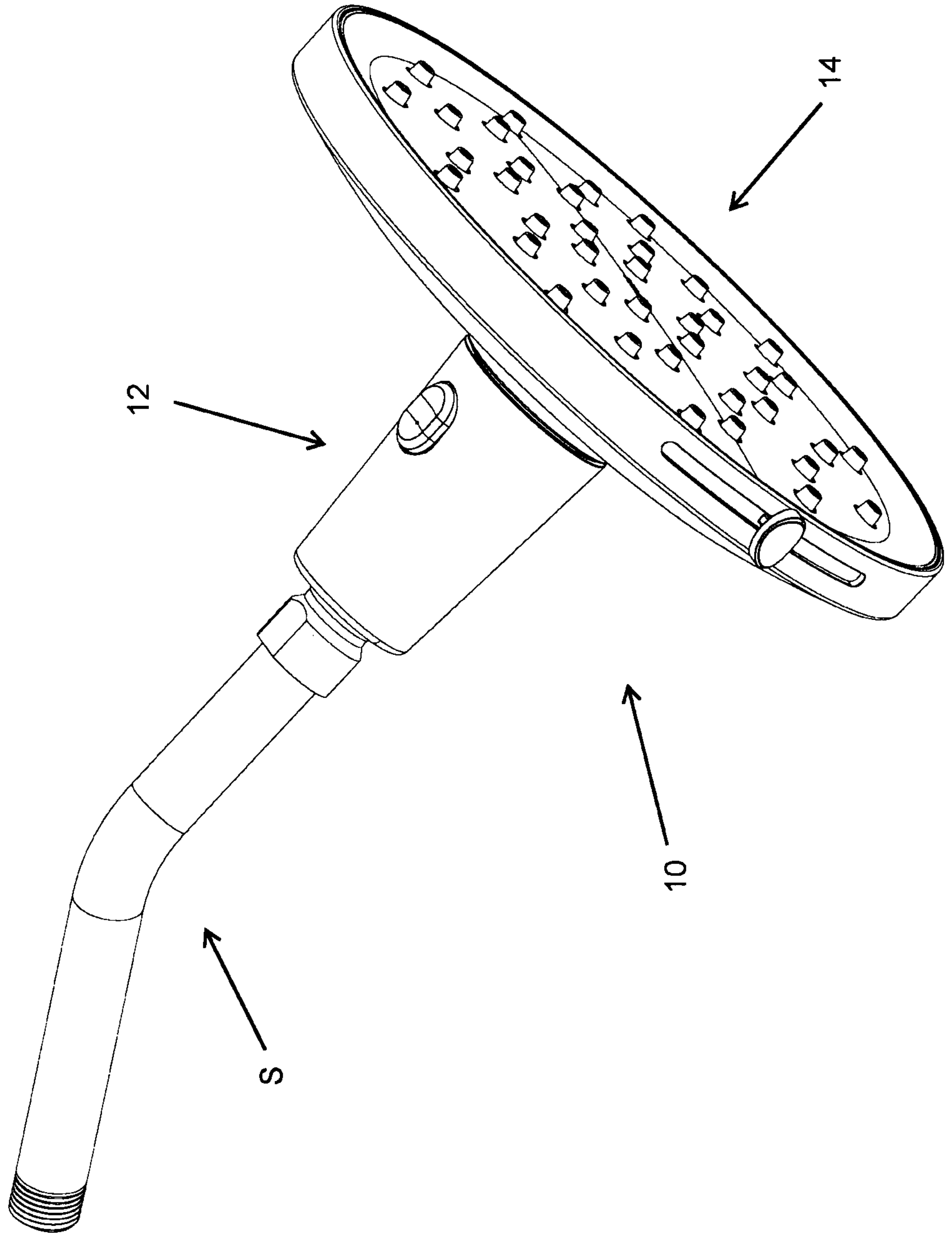
FIG. 1 is a perspective view of a shower system, including a dock and a shower device (such as a showerhead), attached to a water supply pipe (such as a shower arm), according to an exemplary embodiment of the present invention.
Figure 2:
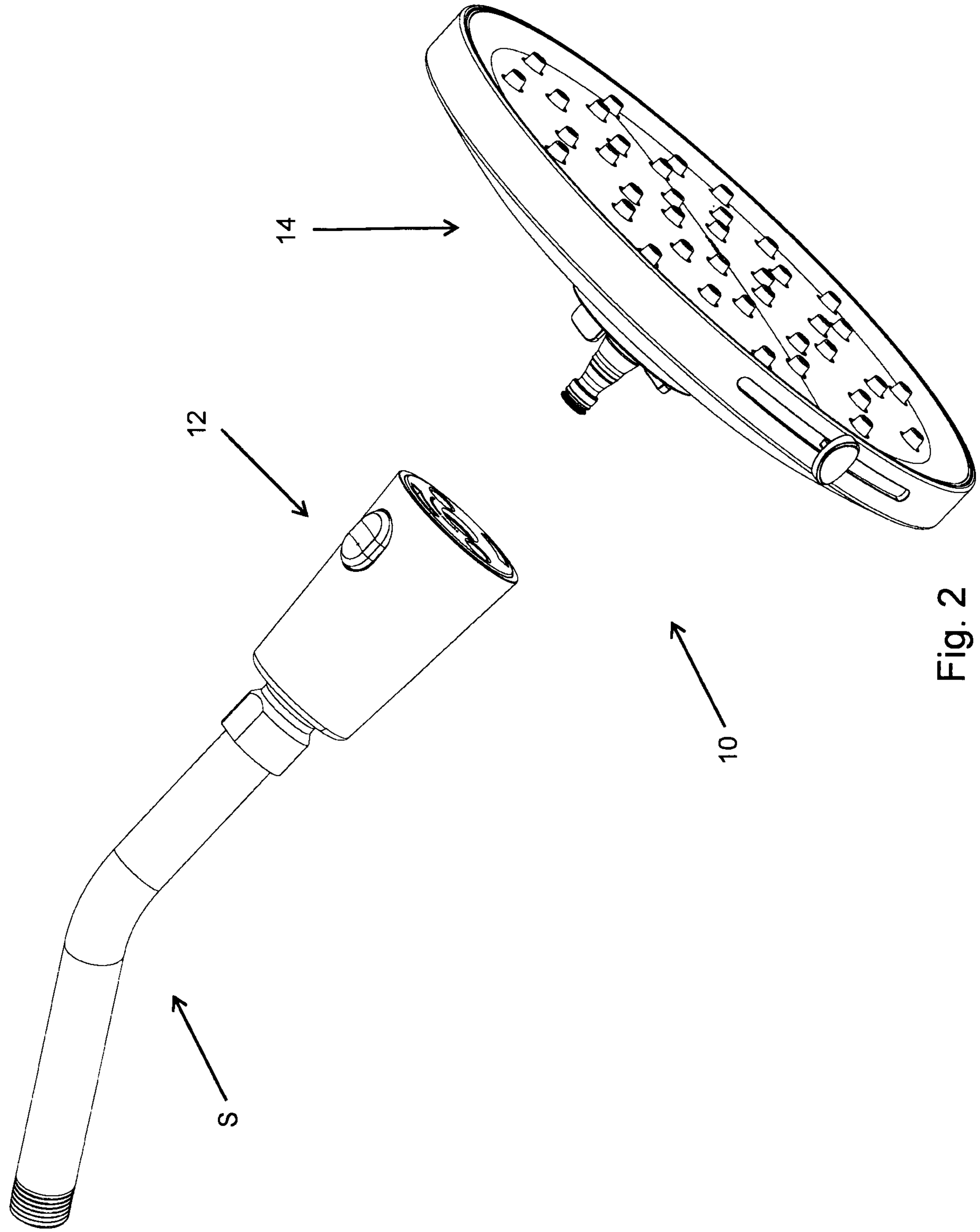
FIG. 2 is a perspective view of the shower system of FIG. 1 with the shower device separated from the dock.
Figure 3:
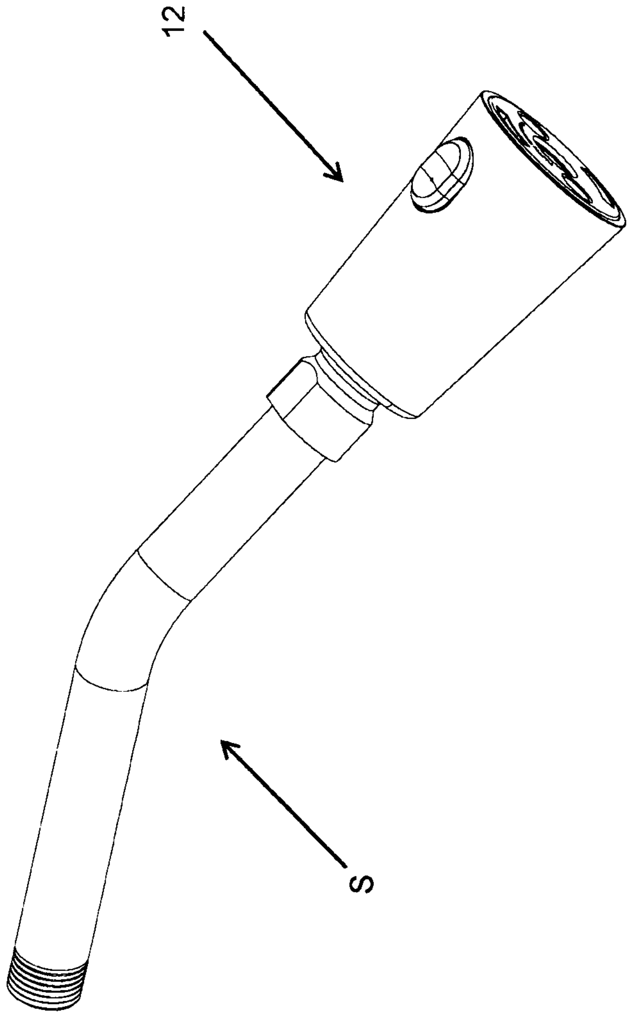
FIG. 3 is a perspective view of the dock of the shower system of FIG. 1 attached to the water supply pipe in a first position.
Figure 4:
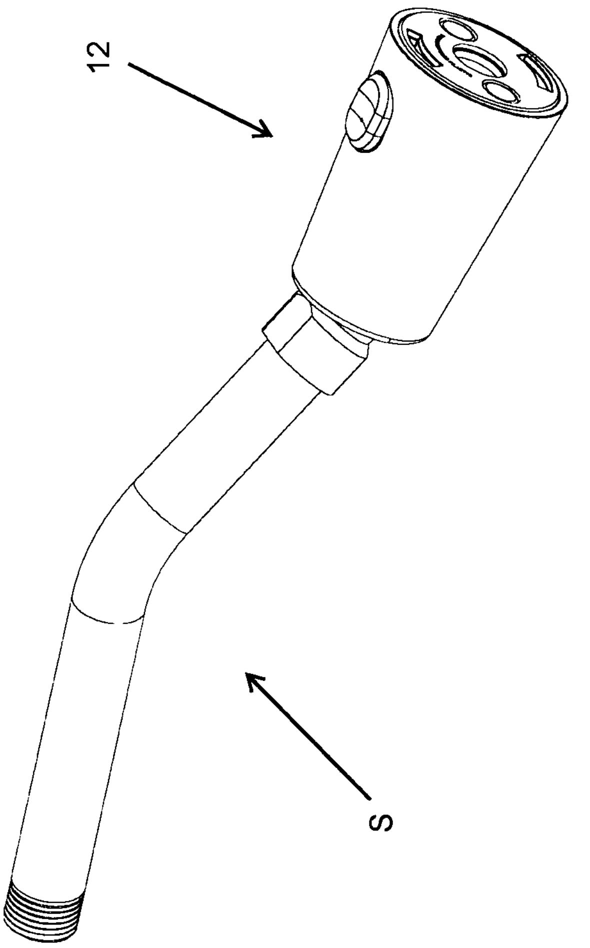
FIG. 4 is a perspective view of the dock of the shower system of FIG. 1 attached to the water supply pipe in a second position.
Figure 5:
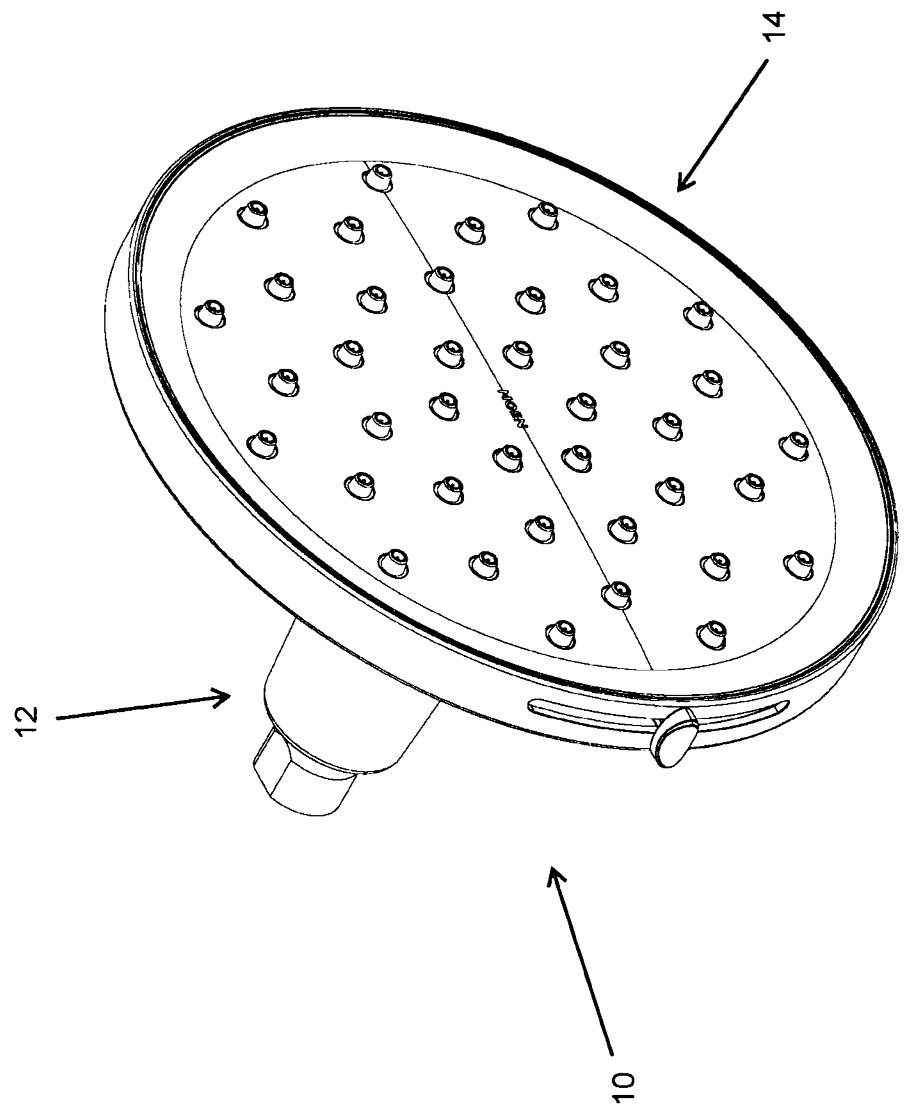
FIG. 5 is a perspective view of the shower system of FIG. 1 not attached to the water supply pipe.
Figure 6:
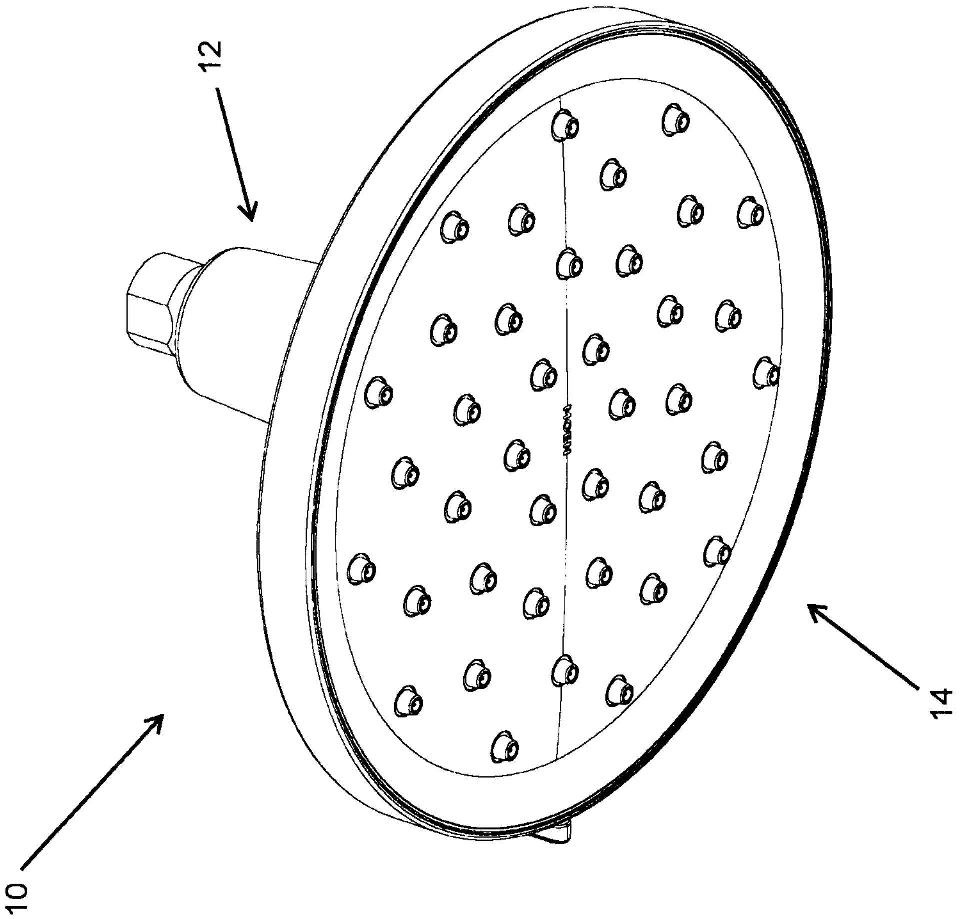
FIG. 6 is another perspective view of the shower system of FIG. 1 not attached to the water supply pipe.
Figure 7:
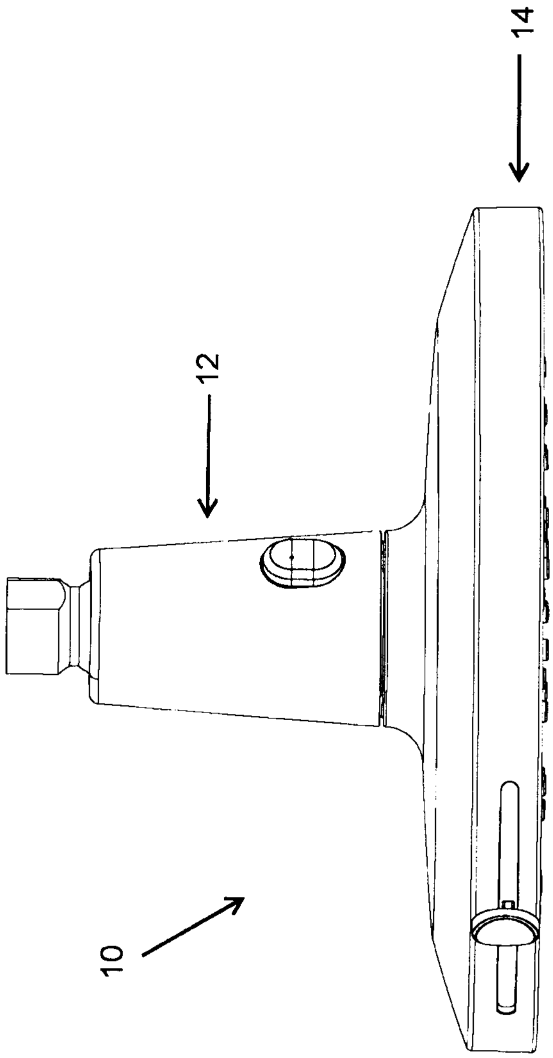
FIG. 7 is a side view of the shower system of FIG. 1 not attached to the water supply pipe.
Figure 8:
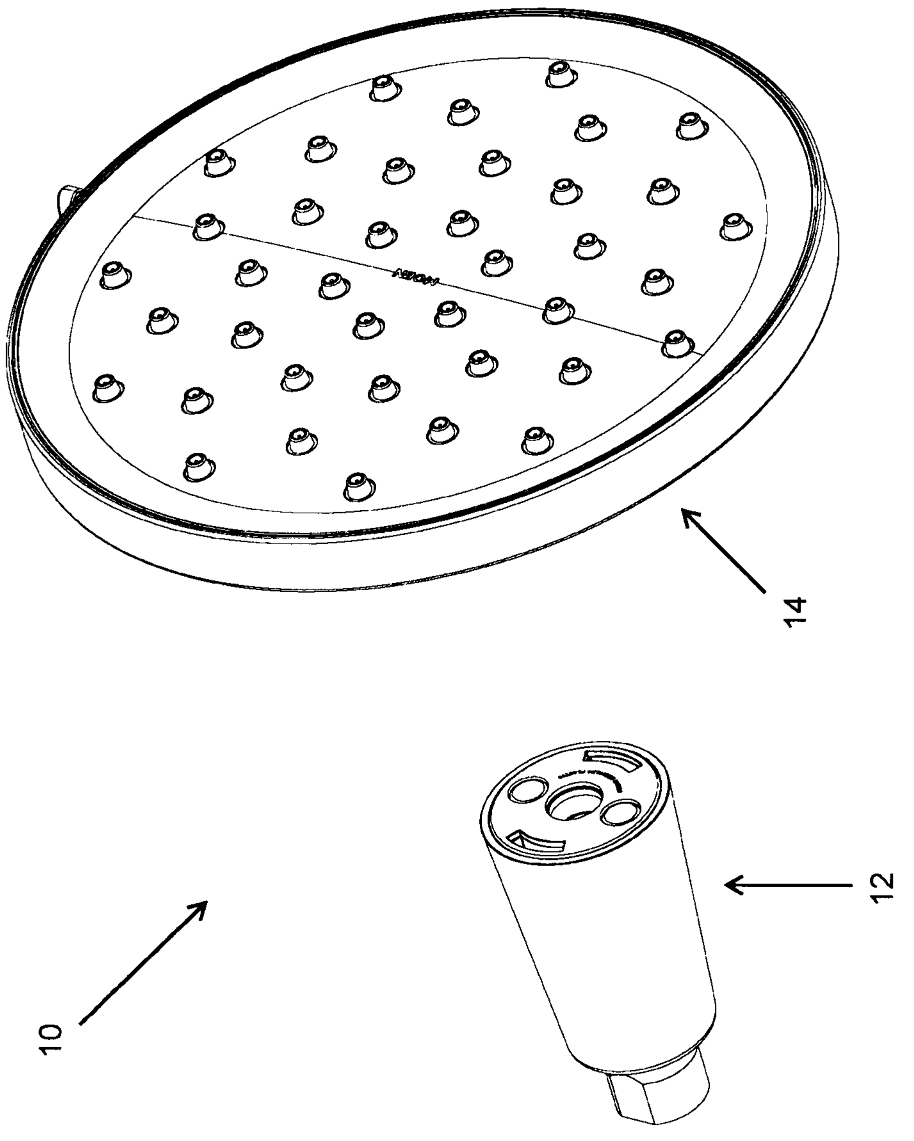
FIG. 8 is a perspective view of the shower system of FIG. 1 with the shower device separated from the dock and not attached to the water supply pipe.
Figure 9:
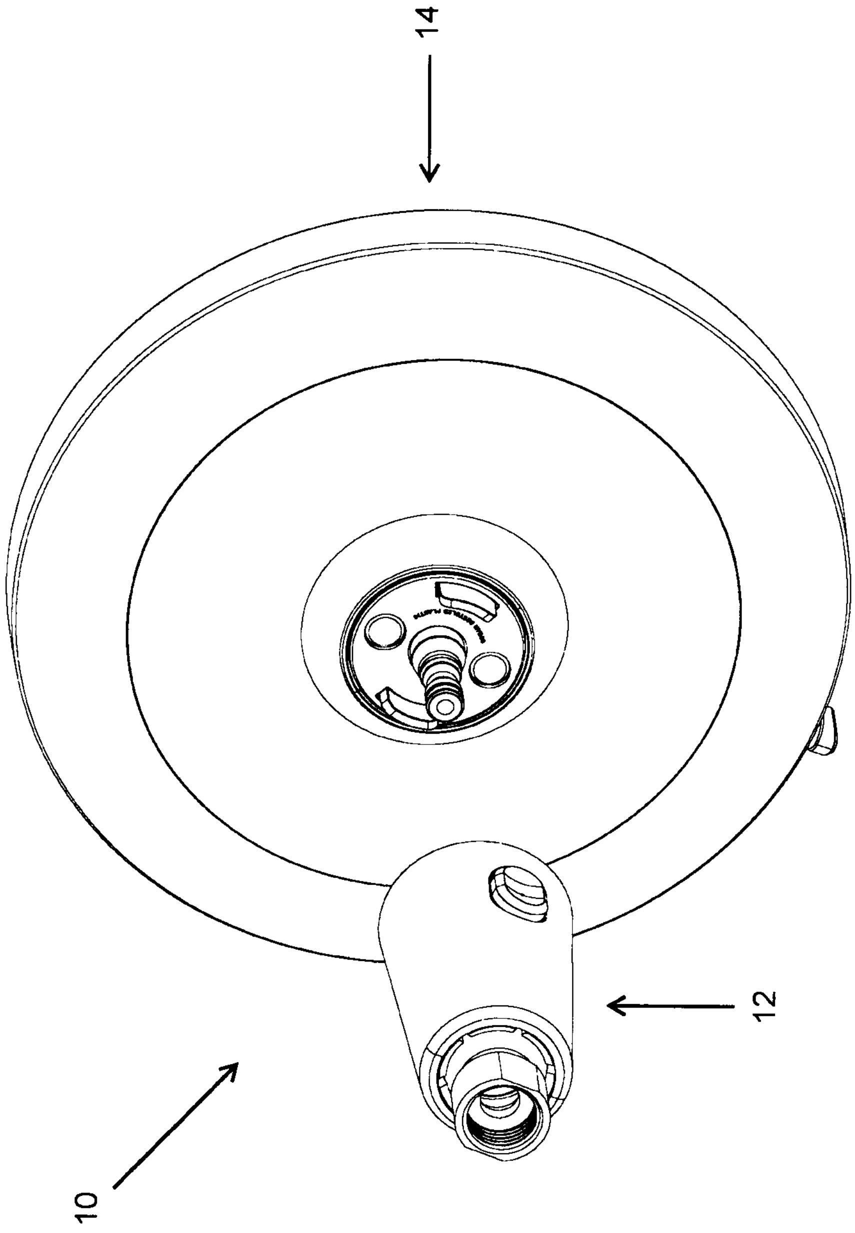
FIG. 9 is another perspective view of the shower system of FIG. 1 with the shower device separated from the dock and not attached to the water supply pipe.
Figure 10:
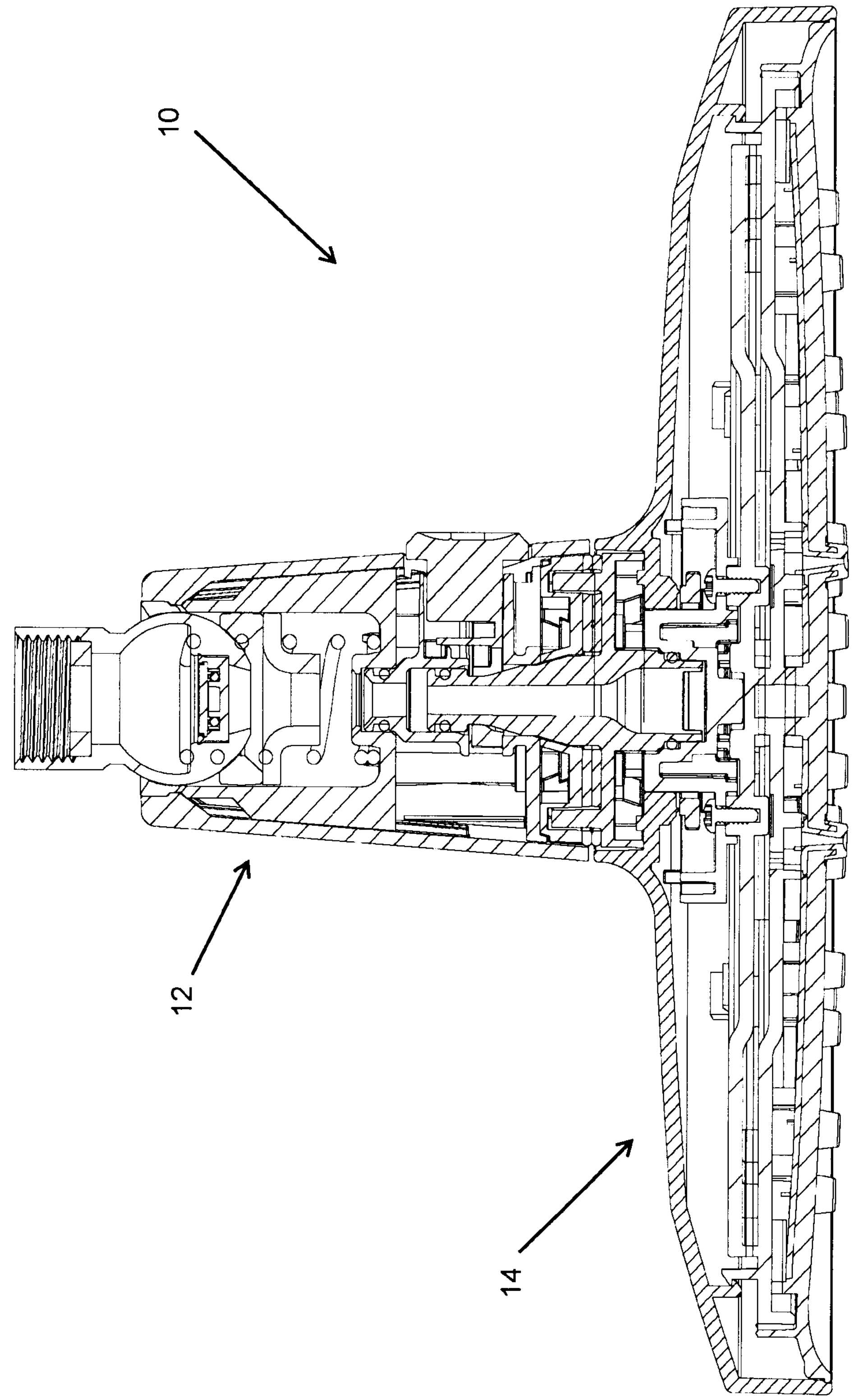
FIG. 10 is a cross-sectional side view of the shower system of FIG. 1 not attached to the water supply pipe.
Figure 11:
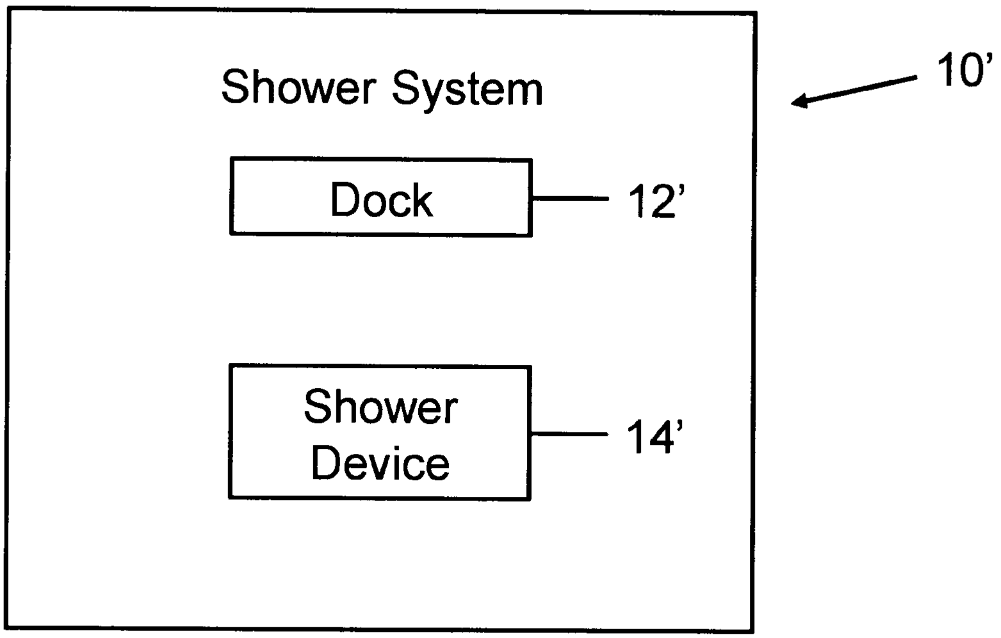
FIG. 11 is an illustration of a shower system according to another exemplary embodiment of the present invention.
Figure 12:
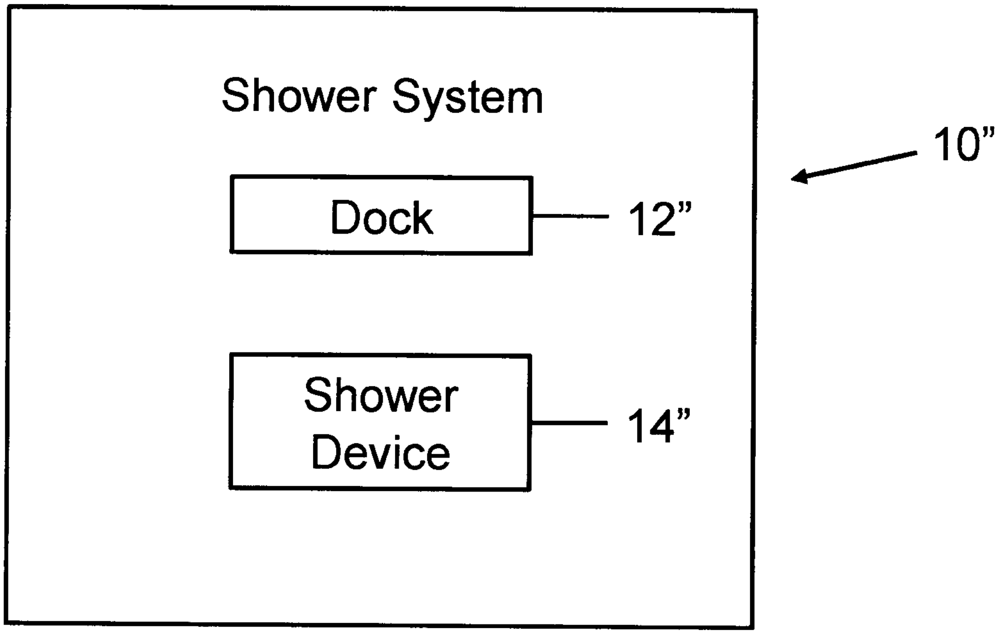
FIG. 12 is an illustration of a shower system according to still another exemplary embodiment of the present invention.
Figure 16:
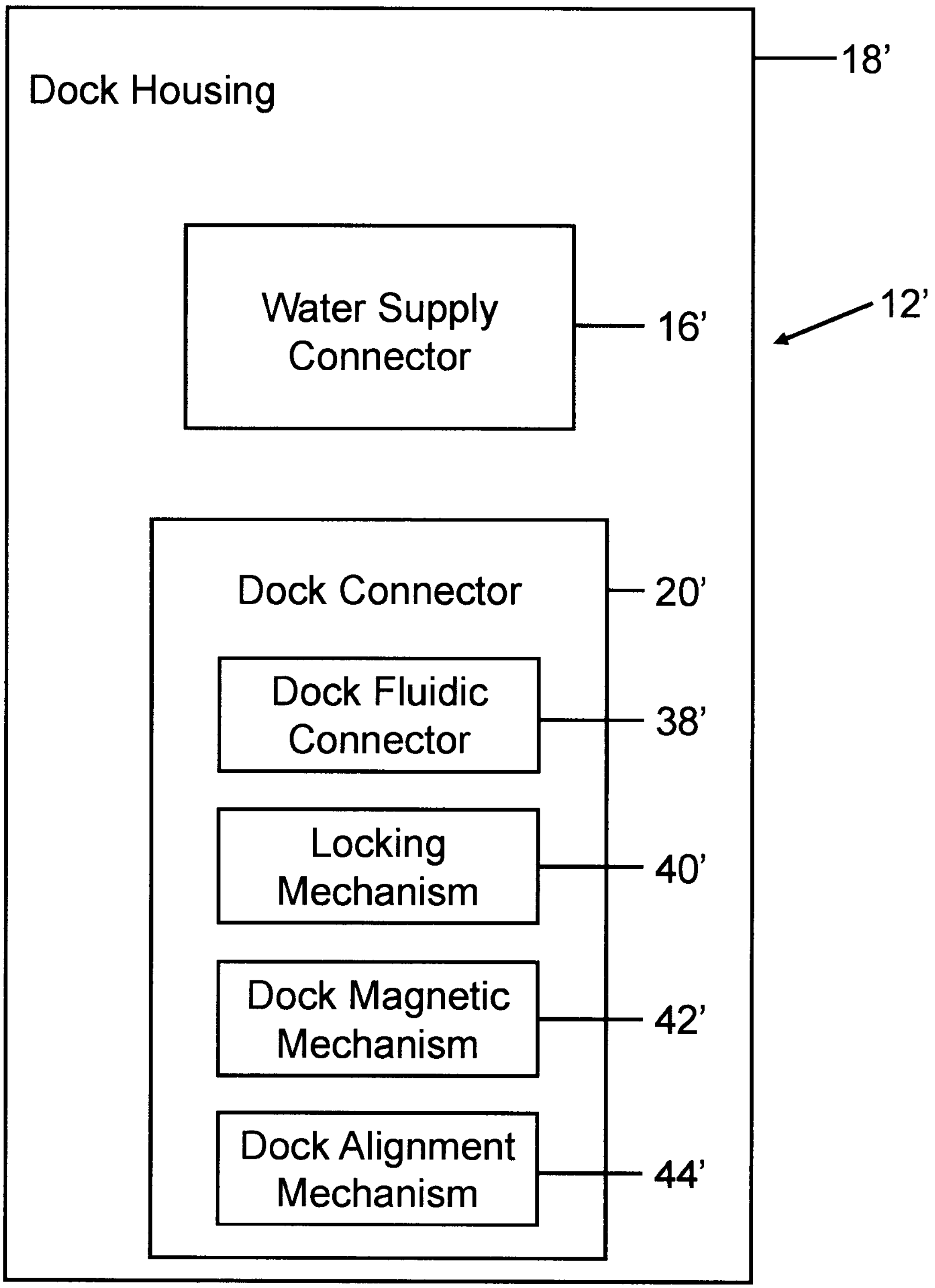
FIG. 16 is an illustration of the dock of the shower system of FIG. 11.
Figure 17:
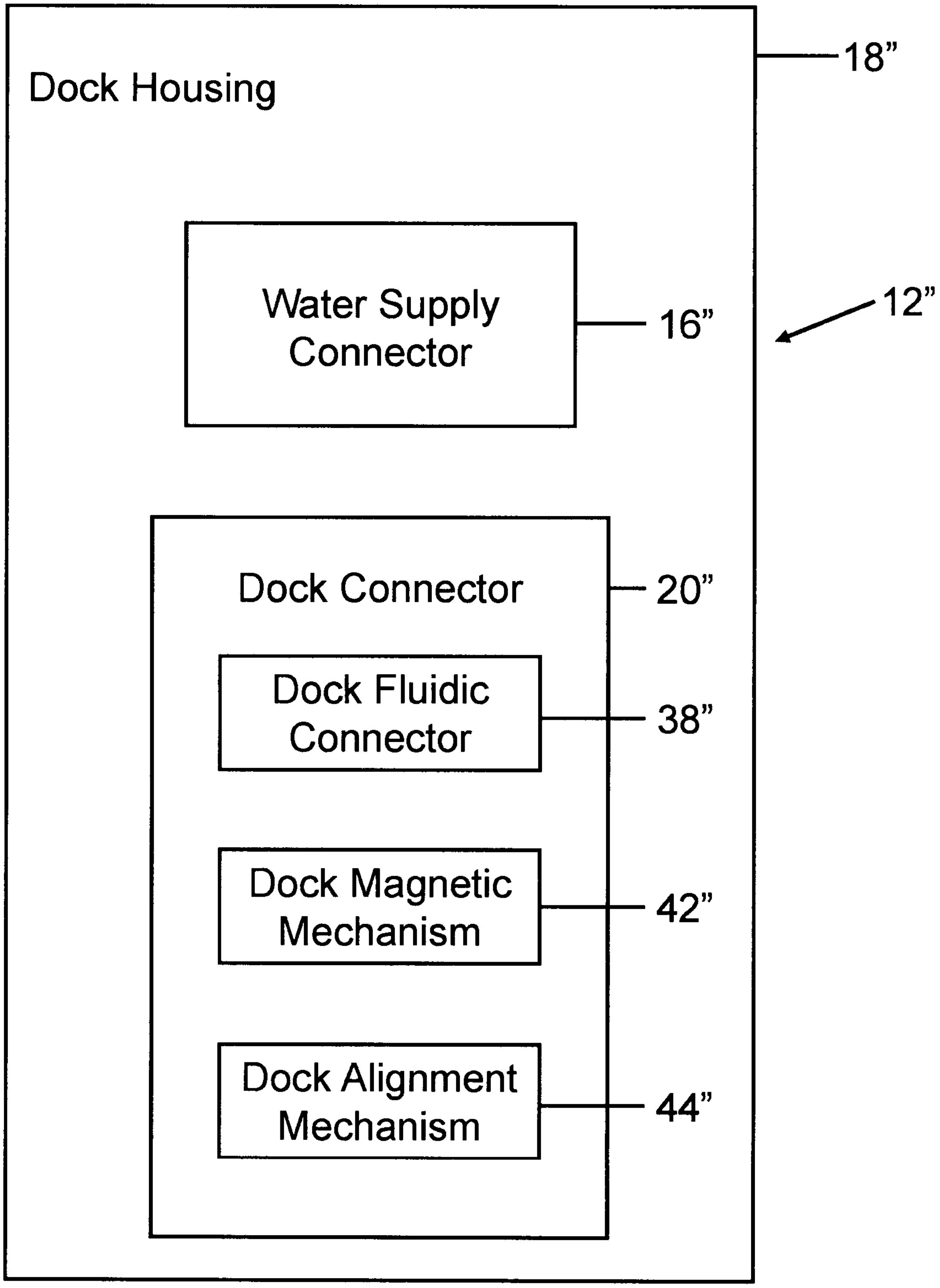
FIG. 17 is an illustration of the dock of the shower system of FIG. 12.
Figure 18:
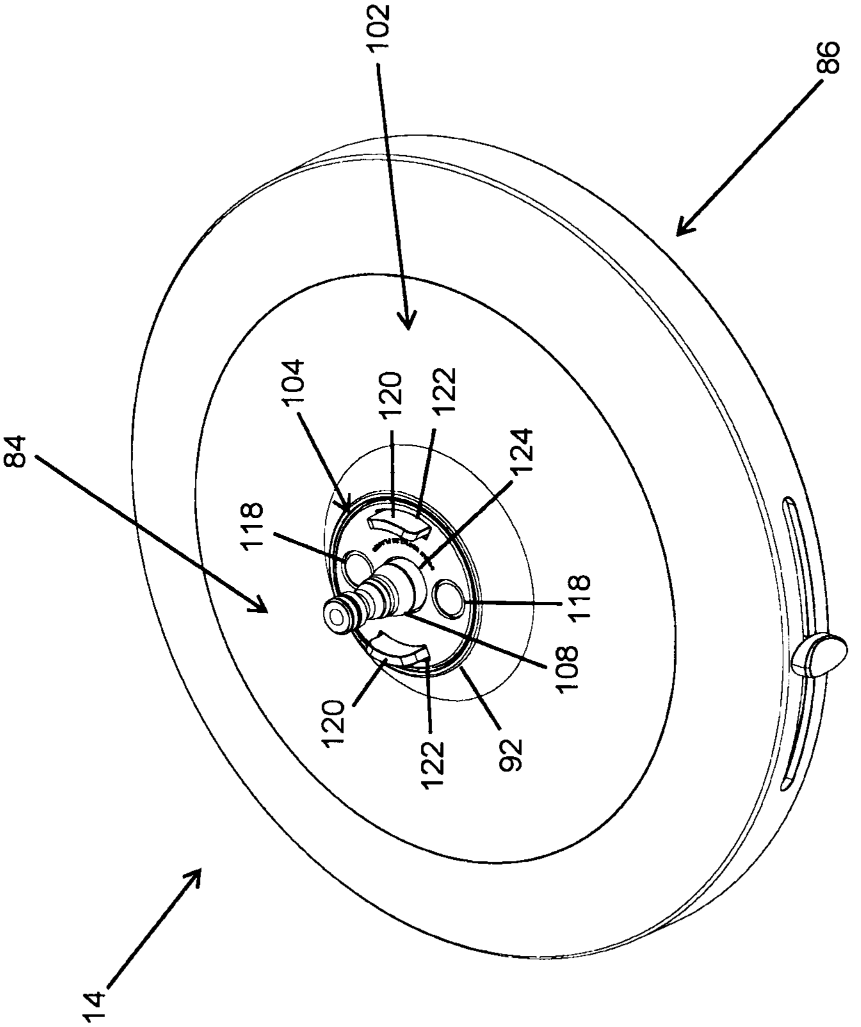
FIG. 18 is a perspective view of the shower device of the shower system of FIG. 1 separated from the dock.
Figure 20:
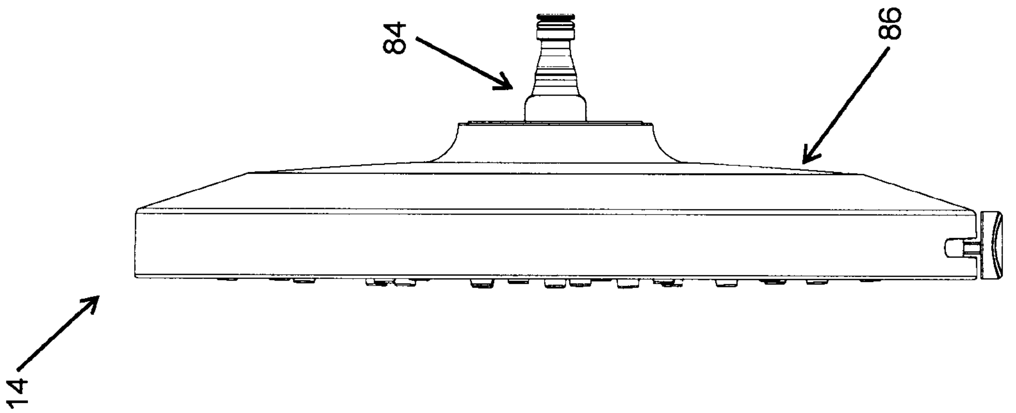
FIG. 20 is a side view of the shower device of the shower system of FIG. 1 separated from the dock.
Figure 19:
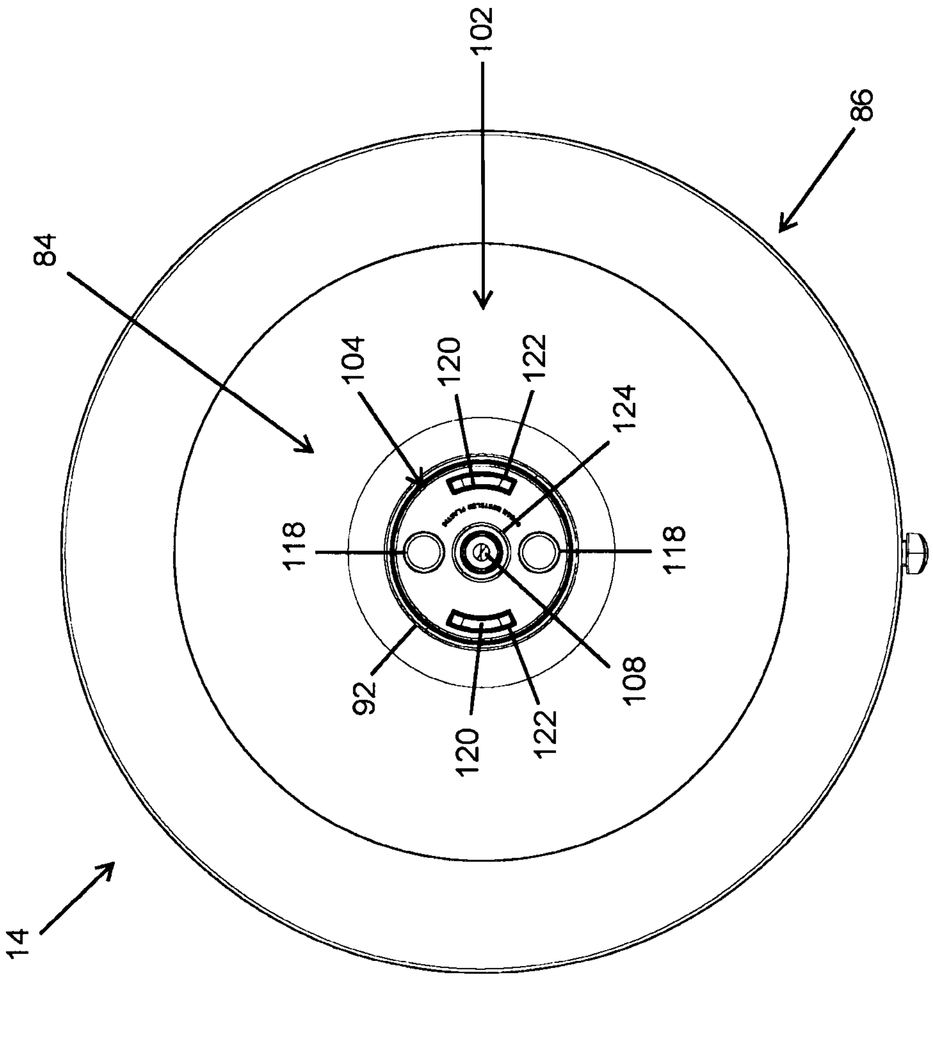
FIG. 19 is a rear view of the shower device of the shower system of FIG. 1 separated from the dock.
Figure 21:
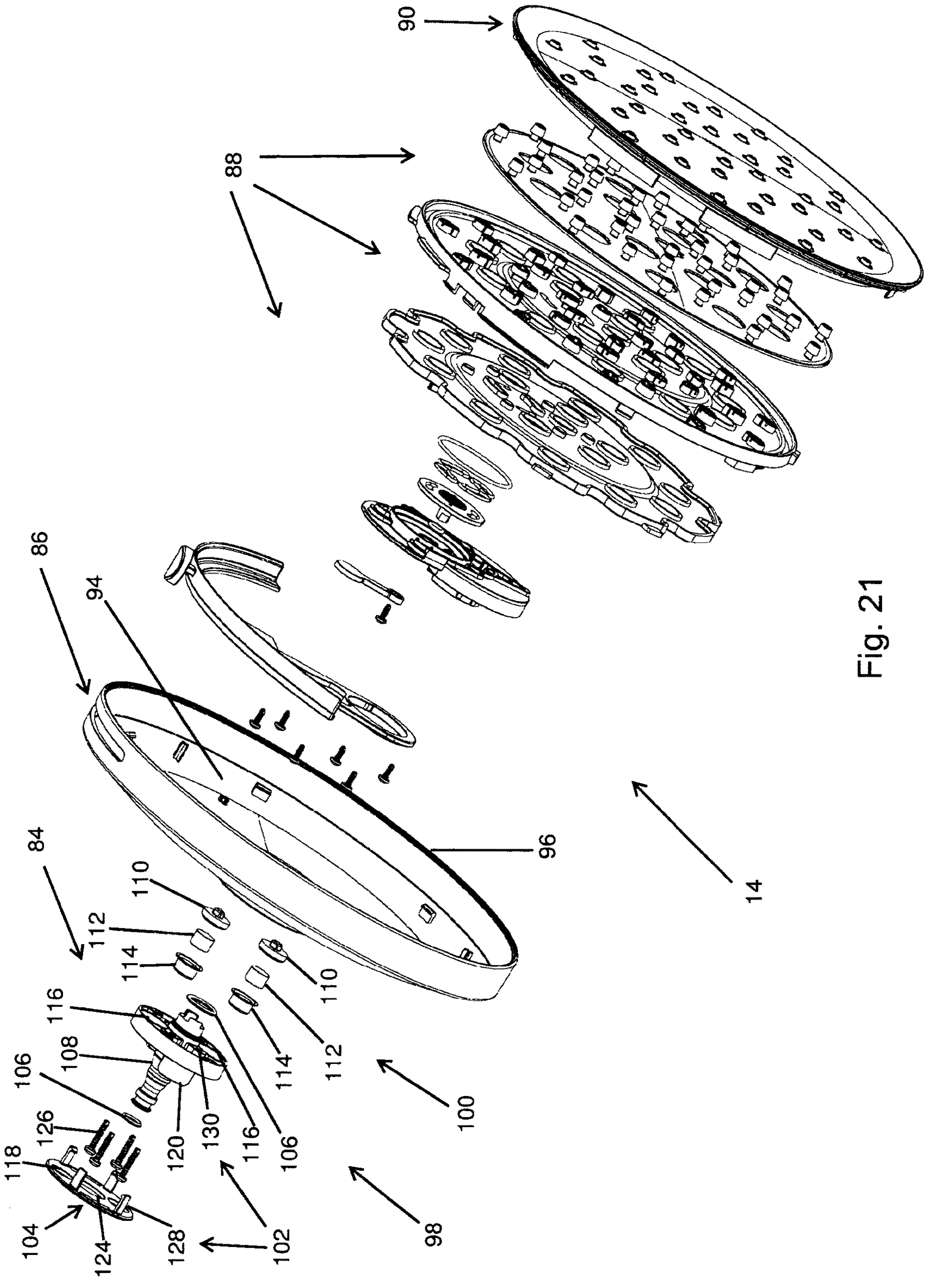
FIG. 21 is an exploded perspective view of the shower device of the shower system of FIG. 1 separated from the dock.
Figure 22:
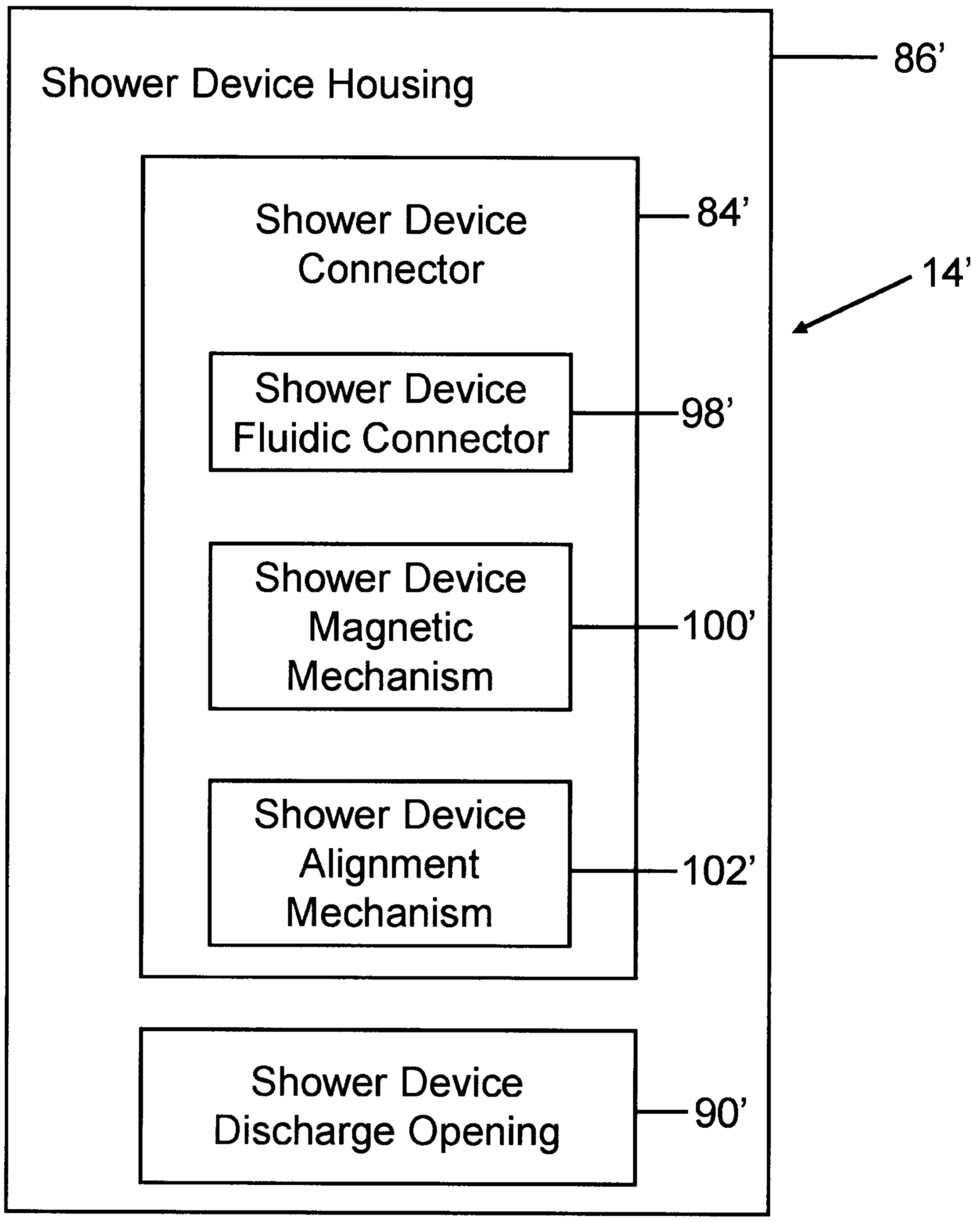
FIG. 22 is an illustration of the shower device of the shower system of FIG. 11.
Figure 23:
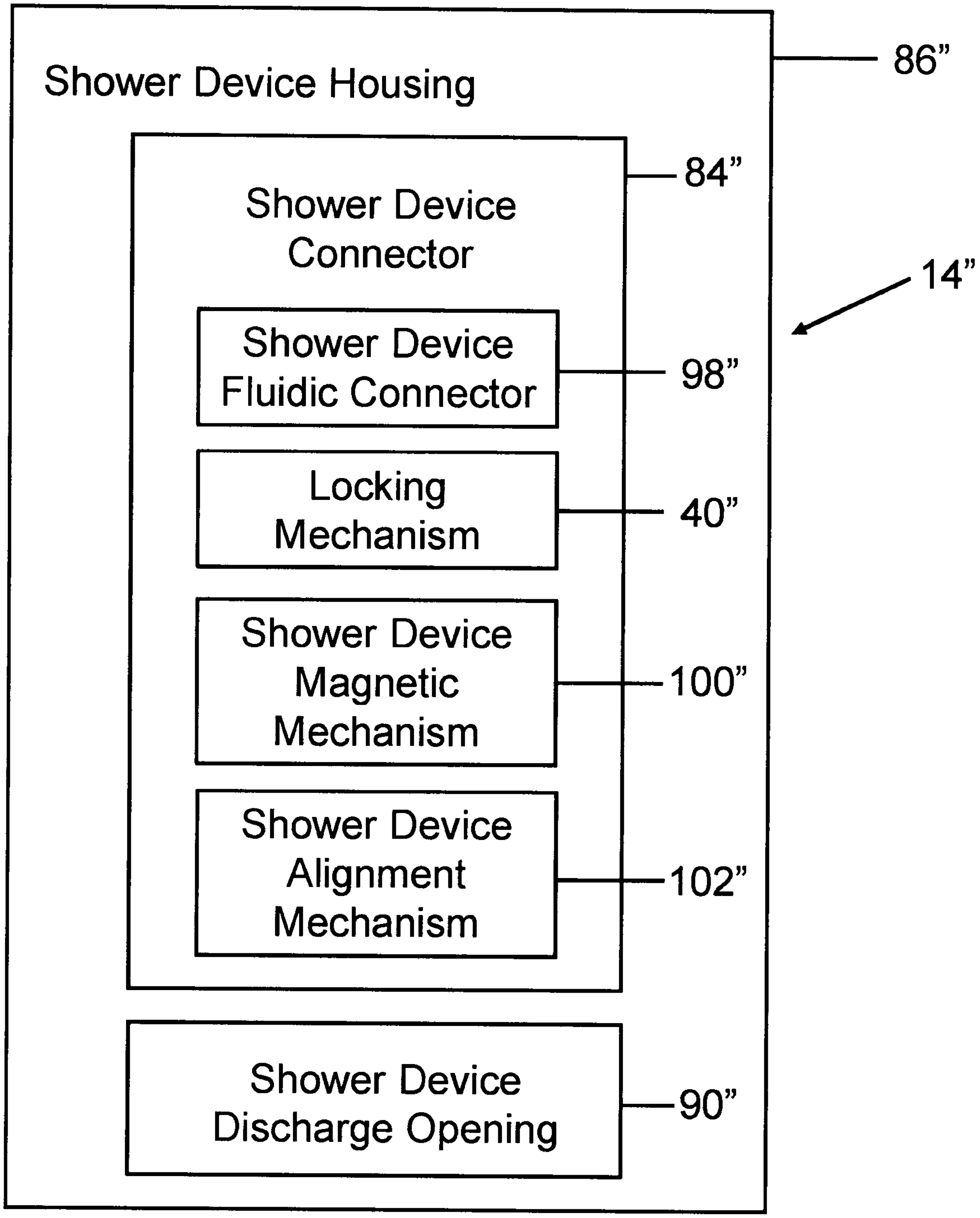
FIG. 23 is an illustration of the shower device of the shower system of FIG. 12.
Figure 24A:
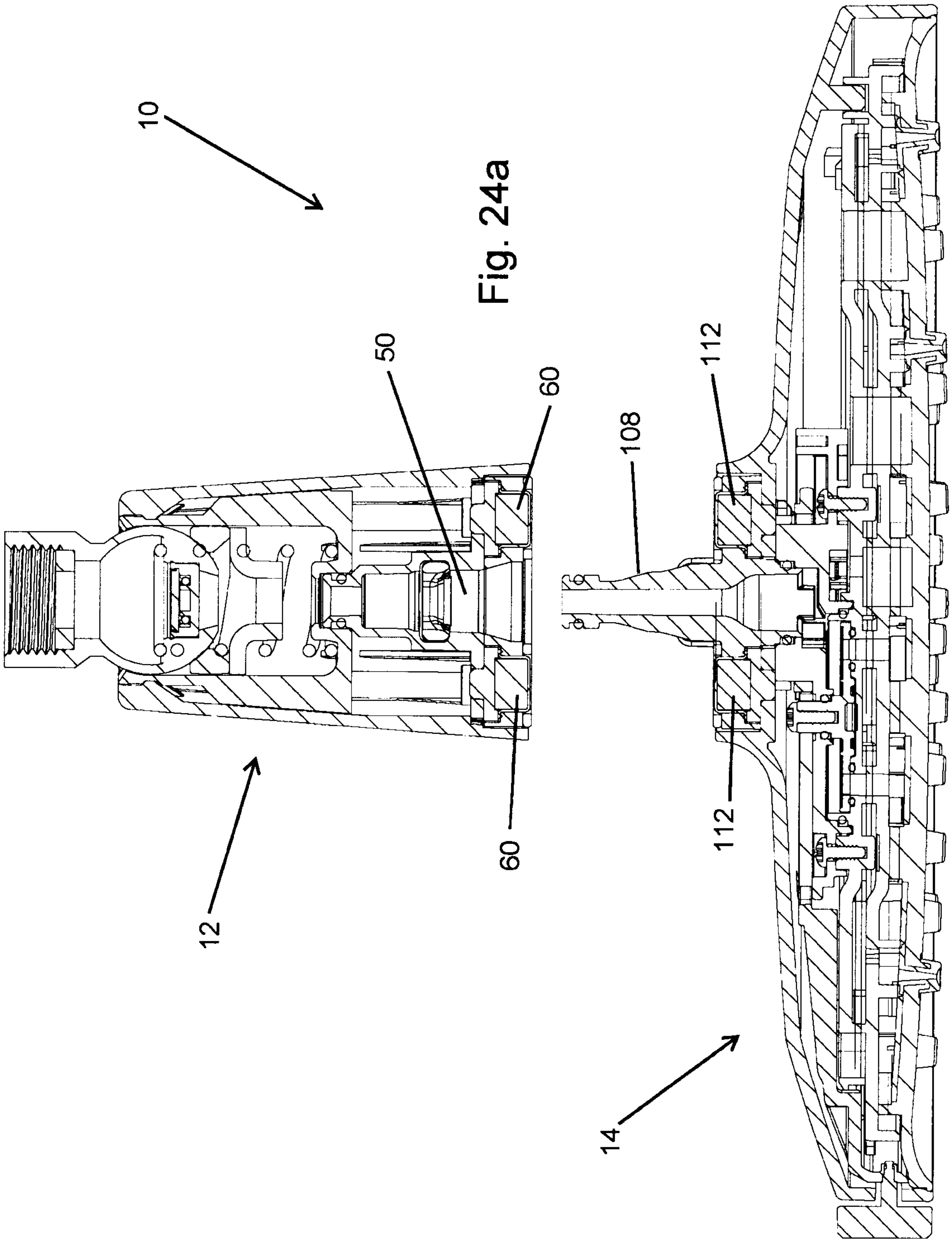
FIGS. 24*a*-24*d* are first cross-sectional side views of the shower system of FIG. 1 taken through the dock magnetic mechanism and the shower device magnetic mechanism and illustrating exemplary connection/docking steps of the shower device to the dock.
Figure 24B:
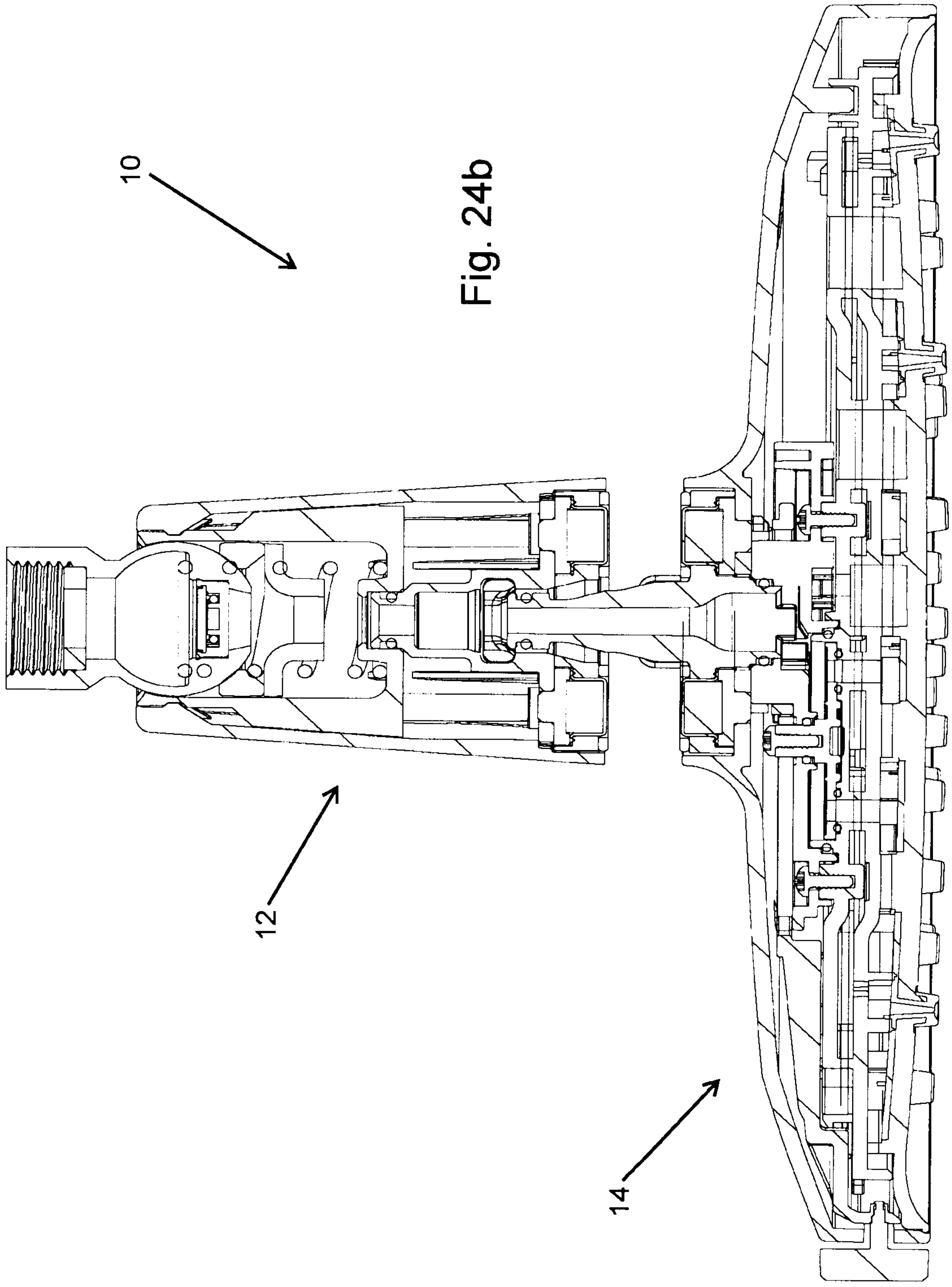
Figure 24C:
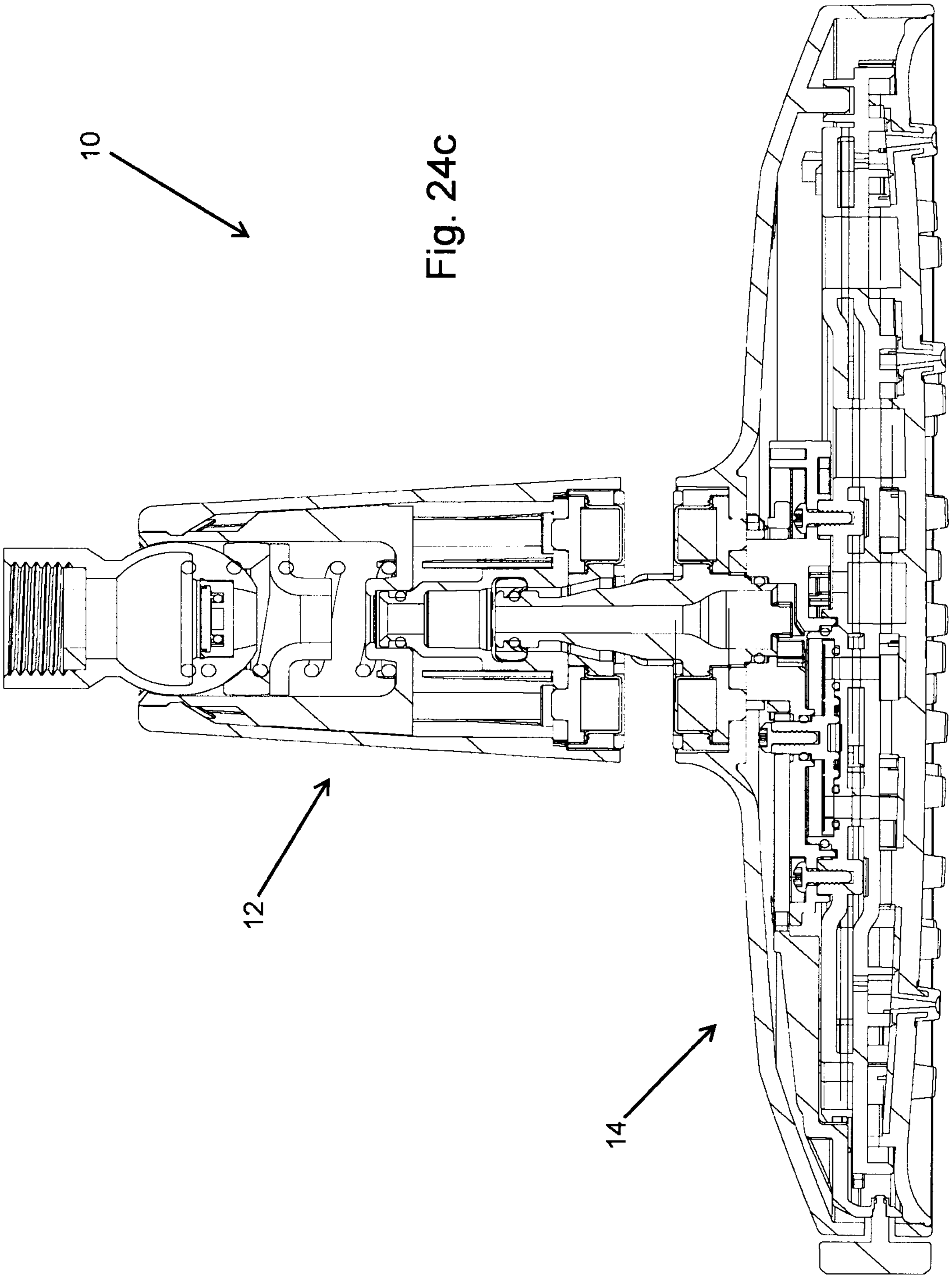
Figure 24D:
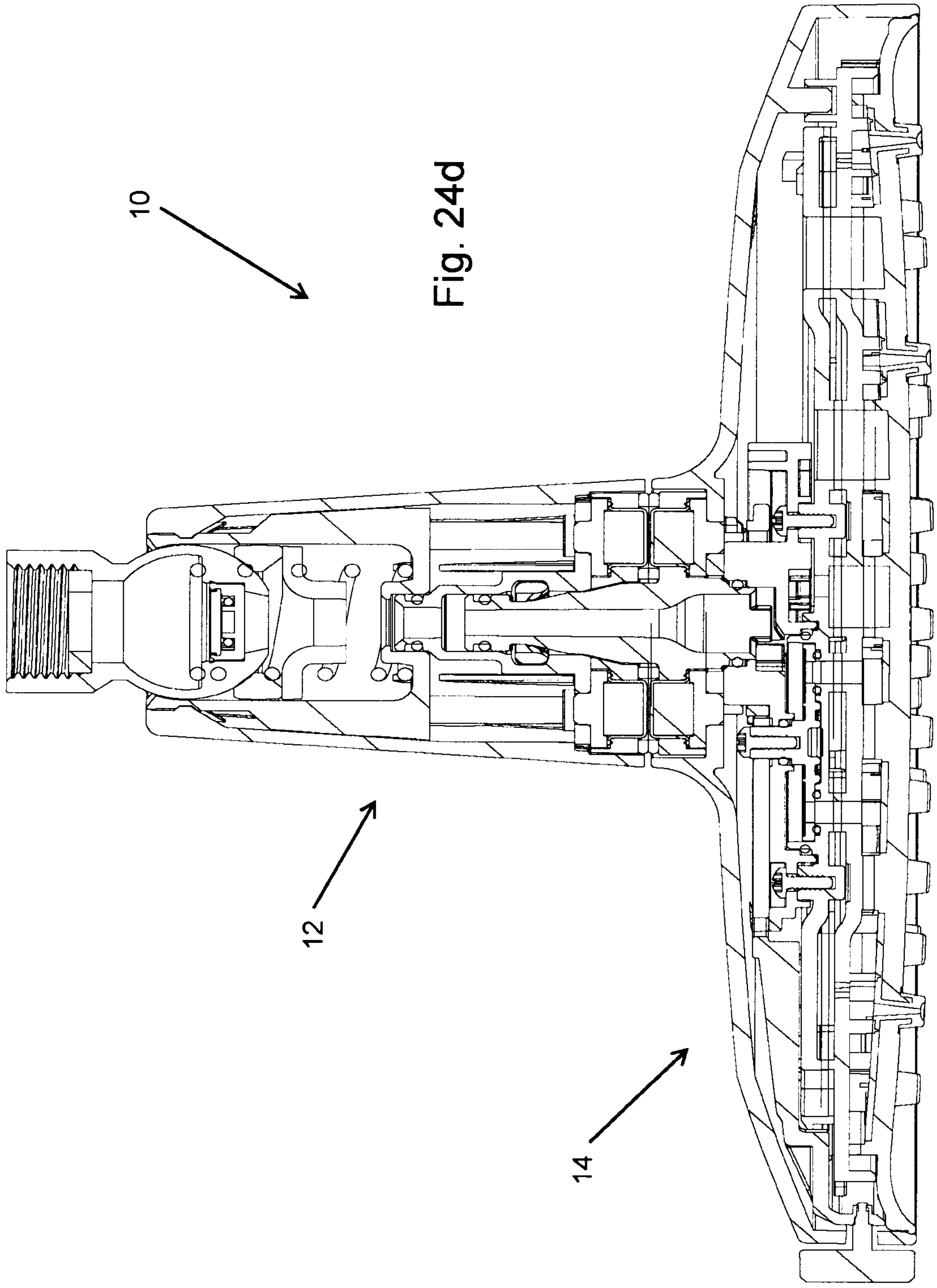
Figure 25A:
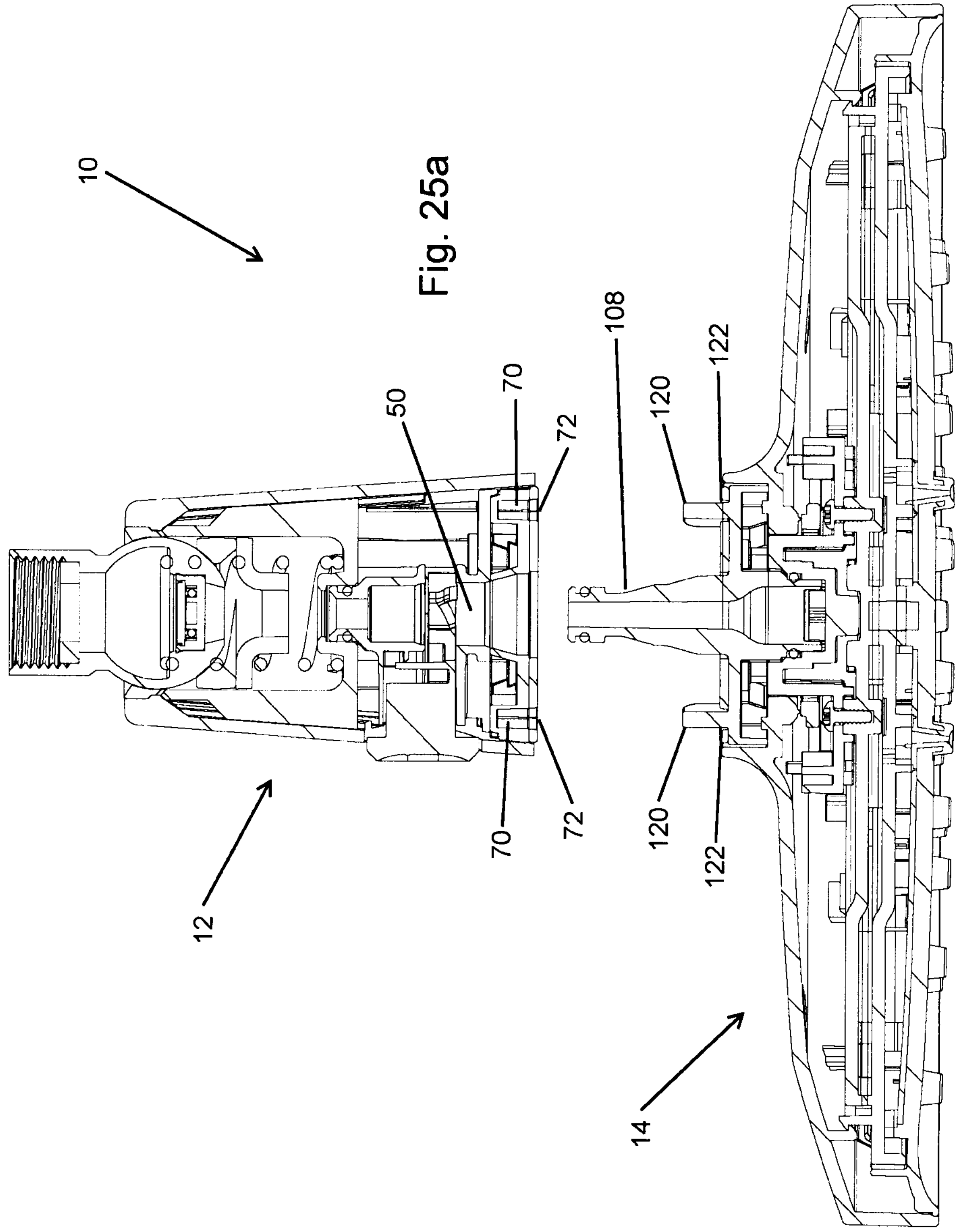
FIGS. 25*a*-25*d* are second cross-sectional side views of the shower system of FIG. 1 taken through the dock alignment mechanism and the shower device alignment mechanism and illustrating exemplary connection/docking steps of the shower device to the dock.
Figure 25B:
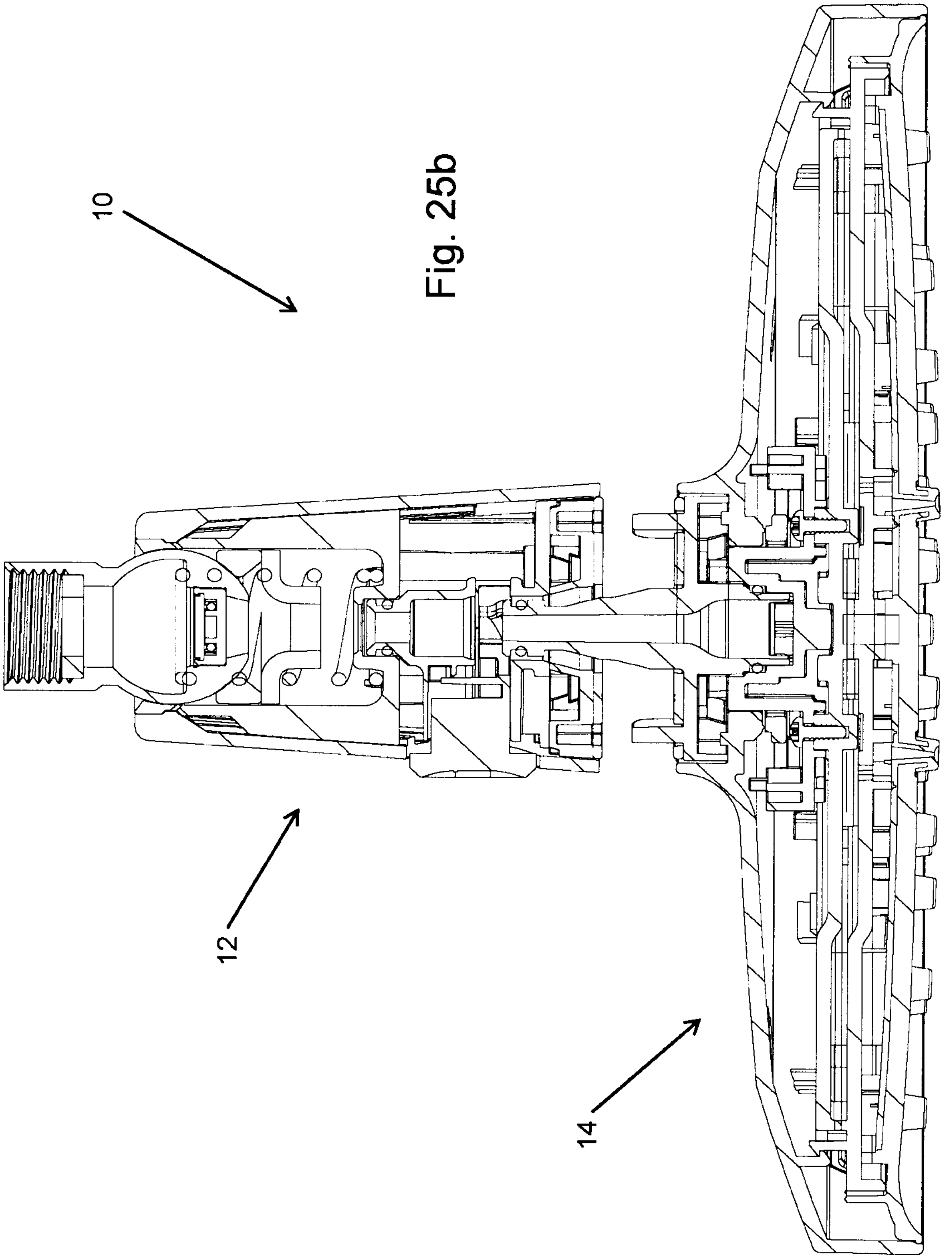
Figure 25C:
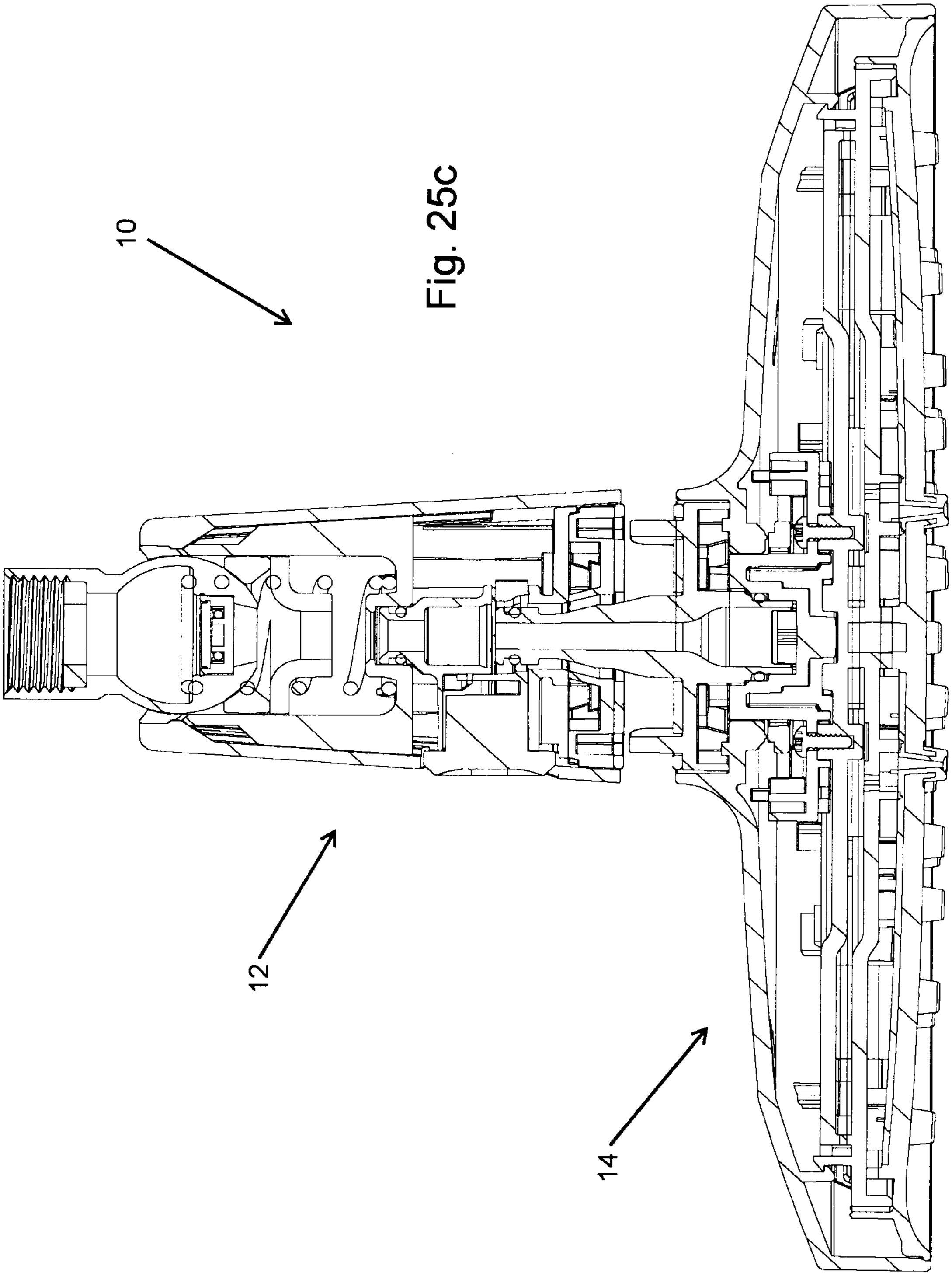
Figure 25D:
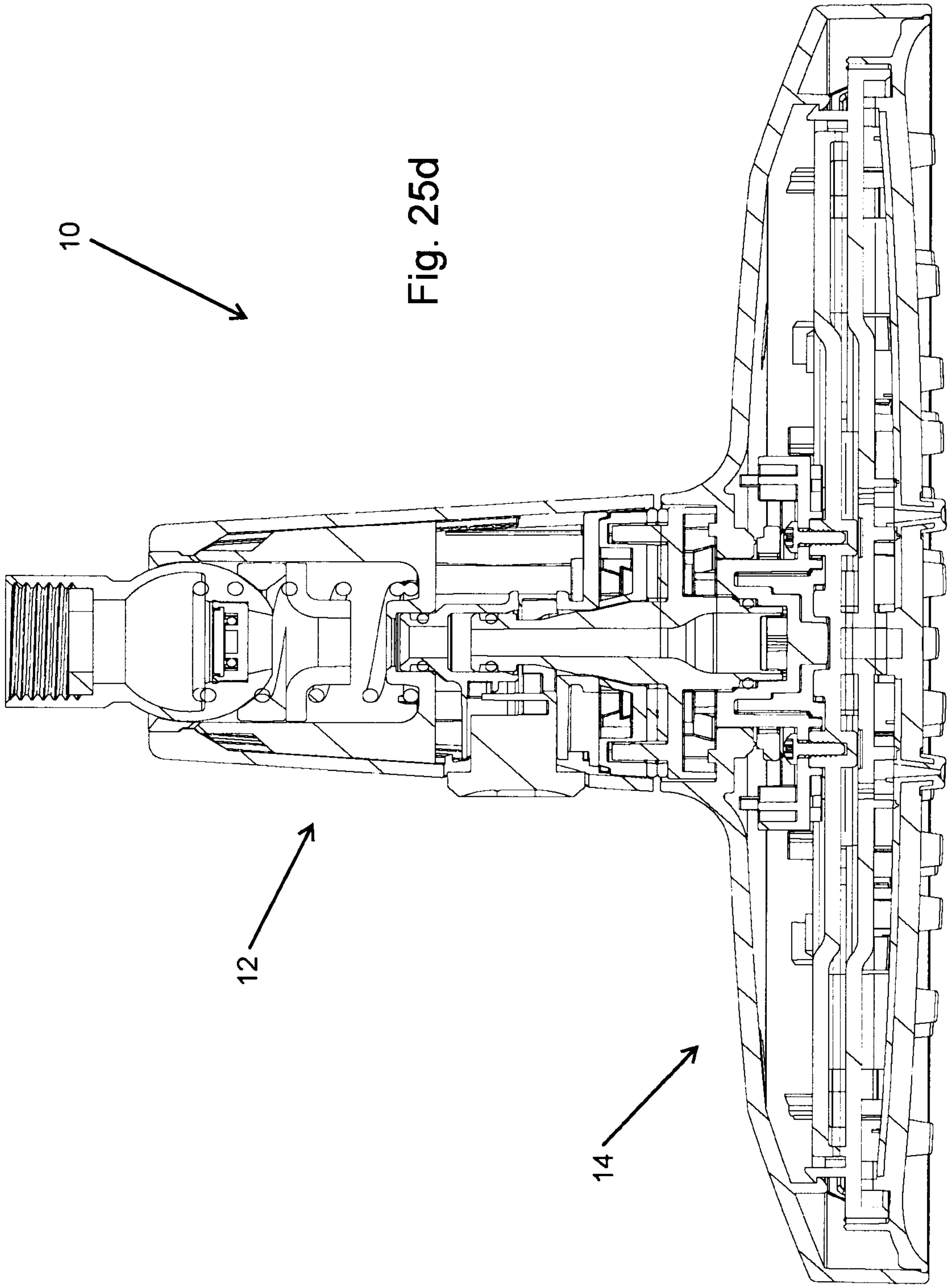

Exemplary embodiments of a shower system 10, 10', 10" of the present invention are shown in detail in FIGS. 1-25*d*. In the illustrated embodiment of FIGS. 1-10, 13-15, 18-21, and 24*a*-25*d*, the shower system 10 includes a dock 12 and a shower device 14. In the illustrated embodiment of FIGS. 11, 16, and 22, the shower system 10' includes a dock 12' and a shower device 14'. In the illustrated embodiment of FIGS. 12, 17, and 23, the shower system 10" includes a dock 12" and a shower device 14". In the illustrated embodiment of FIGS. 1-10, 13-15, 18-21, and 24*a*-25*d*, the shower device 14 is a showerhead. However, one of ordinary skill in the art will appreciate that the shower device 14 could be a handheld shower, a shower hose, or any other shower device that can be connected to the dock 12.

Exemplary embodiments of the dock 12, 12', 12" are shown in detail in FIGS. 13-15, 16, and 17, respectively. In the illustrated embodiment of FIGS. 13-15, the dock 12 includes a water supply connector 16, a dock housing 18, and a dock connector 20. In the illustrated embodiment of FIG. 16, the dock 12' includes a water supply connector 16', a dock housing 18', and a dock connector 20'. In the illustrated embodiment of FIG. 17, the dock 12" includes a water supply connector 16", a dock housing 18", and a dock connector 20".

Figure 14:
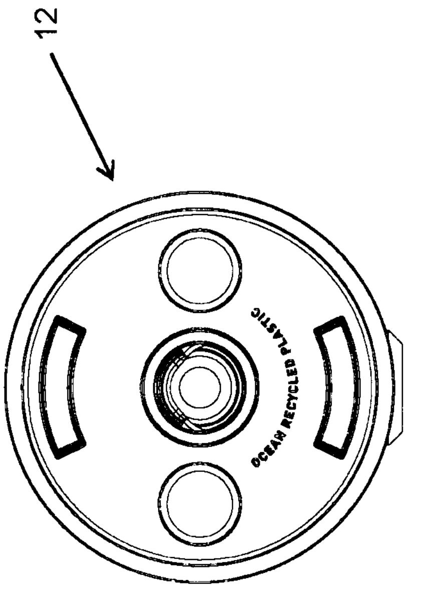
FIG. 14 is a front view of the dock of the shower system of FIG. 1 not attached to the water supply pipe.
Figure 13:
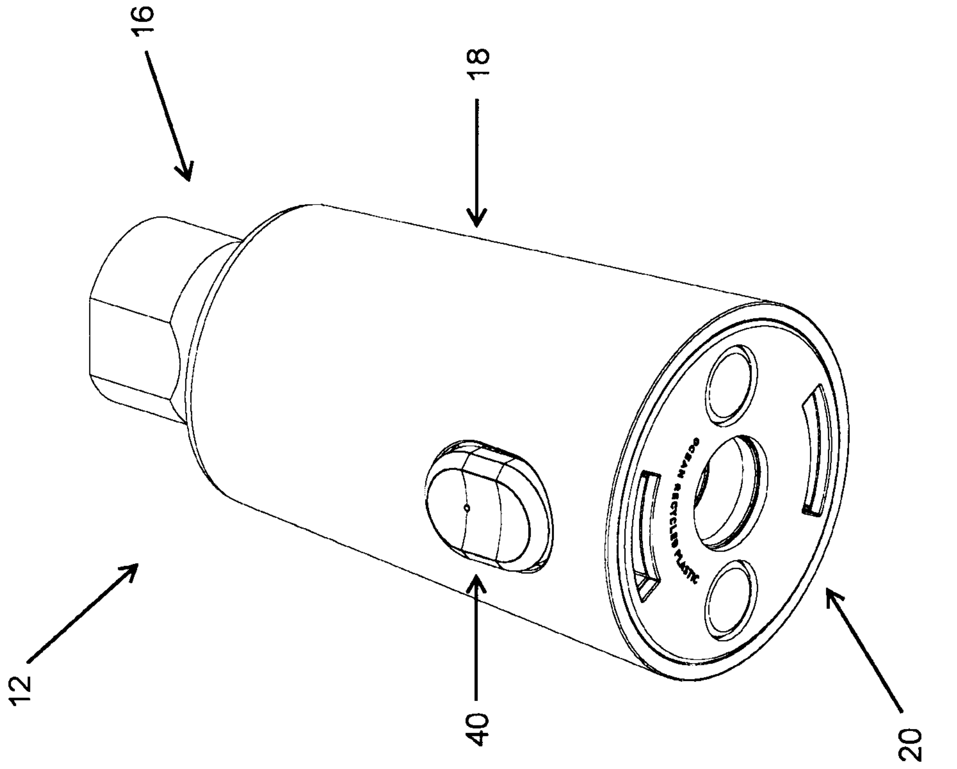
FIG. 13 is a perspective view of the dock of the shower system of FIG. 1 not attached to the water supply pipe.
Figure 15:
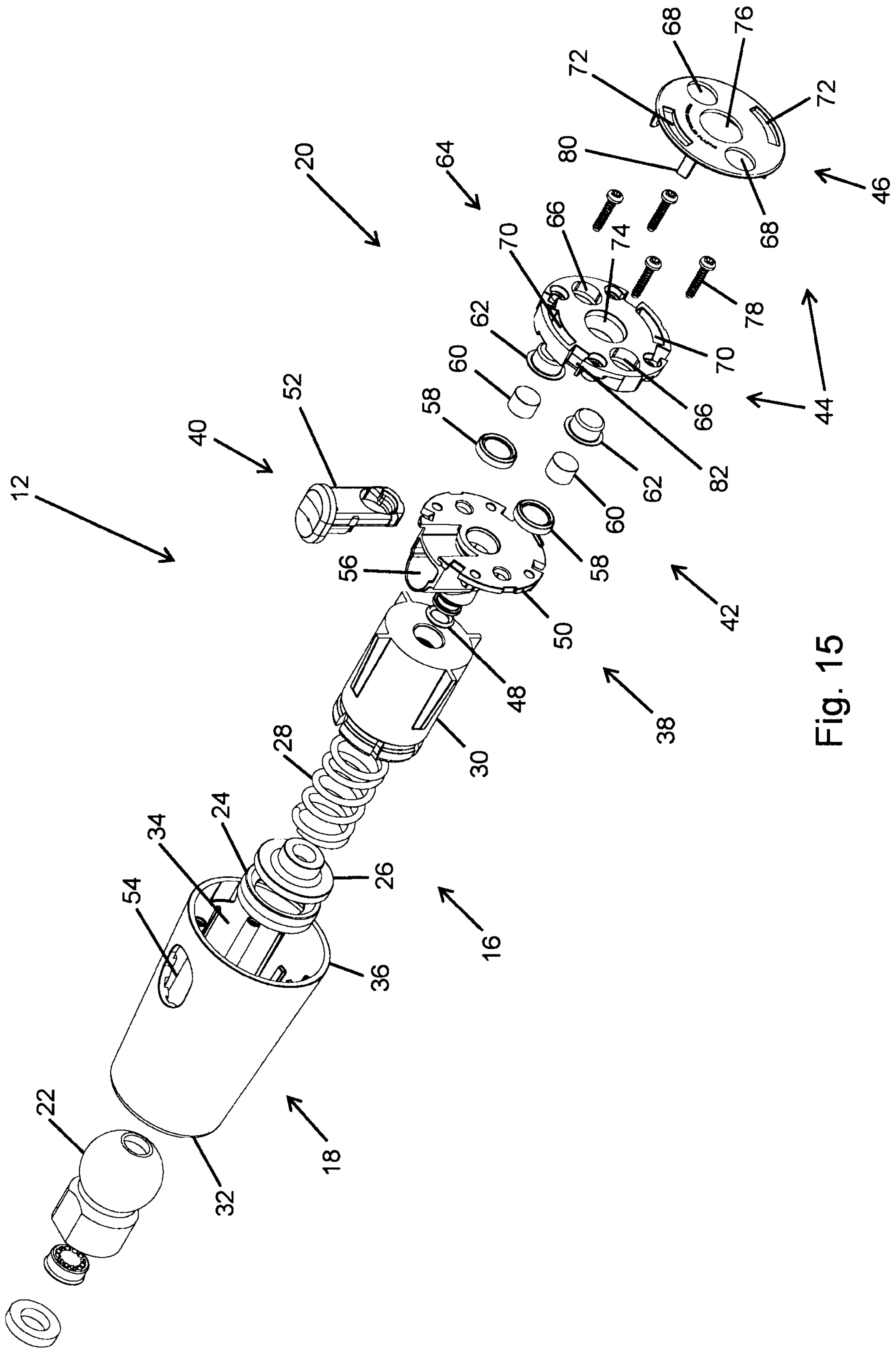
FIG. 15 is an exploded perspective view of the dock of the shower system of FIG. 1 not attached to the water supply pipe.

An exemplary embodiment of the water supply connector 16 is shown in detail in FIGS. 13-15. In the illustrated embodiment of FIGS. 13-15, the water supply connector 16 is a shower arm connector. In the illustrated embodiment of the FIGS. 13-15, the water supply connector 16 includes a ball 22, a ball seal 24, a ball seal platform 26, a ball spring 28, and a ball retainer 30. In the illustrated embodiment, the water supply connector 16 is operable to attach to a water supply pipe S (such as a shower arm extending from a wall) and receive fluid from a water supply.

An exemplary embodiment of the docking housing 18 is shown in detail in FIGS. 13-15. In the illustrated embodiment of FIGS. 13-15, the dock housing 18 includes a dock upstream opening 32, a dock cavity 34, and a dock downstream opening 36. In the illustrated embodiment, the dock upstream opening 32 and the dock cavity 34 are operable to receive the water supply connector 16. In the illustrated embodiment, the dock cavity 34 and the dock downstream opening 36 are operable to receive the dock connector 20.

Exemplary embodiments of the dock connector 20, 20', 20" are shown in detail in FIGS. 13-15, 16, and 17, respectively. In the illustrated embodiment of FIGS. 13-15, the dock connector 20 includes a dock fluidic connector 38, a locking mechanism 40, a dock magnetic mechanism 42, a dock alignment mechanism 44, and a dock connector cover 46. In the illustrated embodiment of FIG. 16, the dock connector 20' includes a dock fluidic connector 38', a locking mechanism 40', a dock magnetic mechanism 42', and a dock alignment mechanism 44'. In the illustrated embodiment of FIG. 17, the dock connector 20" includes a dock fluidic connector 38", a dock magnetic mechanism 42", and a dock alignment mechanism 44". The dock fluidic connector 38, 38', 38" includes a dock fluid passageway extending therethrough.

An exemplary embodiment of the dock fluidic connector 38 is shown in detail in FIGS. 13-15. In the illustrated embodiment of FIGS. 13-15, the dock fluidic connector 38 includes a sealing member 48 (such as an O-ring) and a first portion of quick connect coupling 50 (such as a female portion of quick connect coupling).

An exemplary embodiment of the locking mechanism 40 is shown in detail in FIGS. 13-15. In the illustrated embodiment of FIGS. 13-15, the locking mechanism 40 includes a push button lock 52. In the illustrated embodiment of FIGS. 13-15, the push button lock 52 extends through a side opening 54 in the dock housing 18 and a side opening 56 in the first portion of quick connect coupling 50.

An exemplary embodiment of the dock magnetic mechanism 42 is shown in detail in FIGS. 13-15. In the illustrated embodiment of FIGS. 13-15, the dock magnetic mechanism 42 includes at least one dock magnet gasket 58 (as shown, two dock magnet gaskets 58), at least one dock magnet 60 (as shown, two dock magnets 60), at least one dock magnet cover 62 (as shown, two dock magnet covers 62), and a dock magnet retainer 64. The dock magnet(s) 60 are operable to produce a magnetic field. In the illustrated embodiment of FIGS. 13-15, the dock magnet retainer 64 includes at least one opening 66 (as shown, two openings 66) for receiving the dock magnet cover(s) 62, the dock magnet(s) 60, and the dock magnet gasket(s) 58. Additionally, in the illustrated embodiments of FIGS. 13-15, the dock connector cover 46 includes at least one opening 68 (as shown, two openings 68) for receiving the dock magnet cover(s) 62 and the dock magnet(s) 60.

An exemplary embodiment of the dock alignment mechanism 44 is shown in detail in FIGS. 13-15. In the illustrated embodiment of FIGS. 13-15, the dock alignment mechanism 44 includes at least one alignment slot 70 (as shown, two alignment slots 70) extending in the dock magnet retainer 64 and at least one alignment slot 72 (as shown, two alignment slots 72) extending in the dock connector cover 46. In the illustrated embodiment of FIGS. 13-15, the dock magnet retainer 64 includes a central opening 74. Additionally, in the illustrated embodiment of FIGS. 13-15, the dock connector cover 46 includes a central opening 76.

In the illustrated embodiment of FIGS. 13-15, the dock connector 20 also includes fasteners 78 (such as screws or other suitable fasteners) for securing the dock magnet retainer 64 to the first portion of quick connect coupling 50. Additionally, in the illustrated embodiment of FIGS. 13-15, the dock connector cover 46 includes at least one retention tab 80 (as shown, a plurality of retention tabs 80) and the dock magnet retainer 64 includes at least one retention opening 82 (as shown, a plurality of retention openings 82) for securing the dock connector cover 46 to the dock magnet retainer 64.

Exemplary embodiments of the shower device 14, 14', 14" are shown in detail in FIGS. 18-21, 22, and 23, respectively. In the illustrated embodiment of FIGS. 18-21, the shower device 14 (again, shown as a showerhead and referred to hereafter as showerhead 14) includes a showerhead connector 84, a showerhead housing 86, a showerhead engine 88, and a showerhead discharge opening 90 (such as a showerhead sprayface). In the illustrated embodiment of FIG. 22, the shower device 14' includes a shower device connector 84', a shower device housing 86', and a shower device discharge opening 90'. In the illustrated embodiment of FIG. 23, the shower device 14" includes a shower device connector 84", a shower device housing 86", and a shower device discharge opening 90".

An exemplary embodiment of the showerhead housing 86 is shown in detail in FIGS. 18-21. In the illustrated embodiment of FIGS. 18-21, the showerhead housing 86 includes a showerhead upstream opening 92, a showerhead cavity 94, and a showerhead downstream opening 96. In the illustrated embodiment, the showerhead upstream opening 92 and the showerhead cavity 94 are operable to receive the showerhead connector 84. In the illustrated embodiment, the showerhead cavity 94 is operable to receive the showerhead engine 88. In the illustrated embodiment, the showerhead downstream opening 96 is operable to receive the showerhead sprayface 90. In the illustrated embodiment, the showerhead sprayface 90 is operable to deliver fluid from the showerhead 14. In the illustrated embodiment, the showerhead sprayface 90 is operable to deliver fluid from the showerhead 14 in a plurality of modes, such as spray and massage.

Exemplary embodiments of the showerhead connector 84, 84', 84" are shown in detail in FIGS. 18-21, 22, and 23, respectively. In the illustrated embodiment of FIGS. 18-21, the showerhead connector 84 includes a showerhead fluidic connector 98, a showerhead magnetic mechanism 100, a showerhead alignment mechanism 102, and a showerhead connector cover 104. In the illustrated embodiment of FIG. 22, the shower device connector 84' includes a shower device fluidic connector 98', a shower device magnetic mechanism 100', and a shower device alignment mechanism 102'. In the illustrated embodiment of FIG. 23, the shower device connector 84" includes a shower device fluidic connector 98", a locking mechanism 40", a shower device magnetic mechanism 100", and a shower device alignment mechanism 102". The shower device fluidic connector 98, 98', 98" includes a shower device fluid passageway extending therethrough.

An exemplary embodiment of the showerhead fluidic connector 98 is shown in detail in FIGS. 18-21. In the illustrated embodiment of FIGS. 18-21, the showerhead fluidic connector 98 includes at least one sealing member 106 (such as an O-ring and, as shown, two sealing members 106) and a second portion of quick connect coupling 108 (such as a male portion of quick connect coupling).

An exemplary embodiment of the showerhead magnetic mechanism 100 is shown in detail in FIGS. 18-21. In the illustrated embodiment of FIGS. 18-21, the showerhead magnetic mechanism 100 includes at least one showerhead magnet gasket 110 (as shown, two showerhead magnet gaskets 110), at least one showerhead magnet 112 (as shown, two showerhead magnets 112), and at least one showerhead magnet cover 114 (as shown, two showerhead magnet covers 114). The showerhead magnet(s) 112 are operable to produce a magnetic field. In the illustrated embodiment of FIGS. 18-21, the second portion of quick connect coupling 108 includes at least one opening 116 (as shown, two openings 116) for receiving the showerhead magnet cover(s) 114, the showerhead magnet(s) 112, and the showerhead magnet gasket(s) 110. Additionally, in the illustrated embodiment of FIGS. 18-21, the showerhead connector cover 104 includes at least one opening 118 (as shown, two openings 118) for receiving the showerhead magnet cover(s) 114 and the shower magnet(s) 112.

An exemplary embodiment of the showerhead alignment mechanism 102 is shown in detail in FIGS. 18-21. In the illustrated embodiment of FIGS. 18-21, the showerhead alignment mechanism 102 includes at least one alignment tab 120 (as shown, two alignment tabs 120) extending from the second portion of quick connect coupling 108 and at least one alignment slot 122 (as shown, two alignment slots 122) extending in the showerhead connector cover 104. Additionally, in the illustrated embodiment of FIGS. 18-21, the showerhead connector cover 104 includes a central opening 124.

In the illustrated embodiment of FIGS. 18-21, the showerhead connector 84 also includes fasteners 126 (such as screws or other suitable fasteners) for securing the second portion of quick connect coupling 108 to the showerhead housing 86. In the illustrated embodiment of FIGS. 18-21, the showerhead connector cover 104 includes at least one retention tab 128 (as shown, a plurality of retention tabs 128) and the second portion of quick connect coupling 108 includes at least one retention opening 130 (as shown, a plurality of retention openings 130) for securing the showerhead connector cover 104 to the second portion of quick connect coupling 108.

The flow of fluid (such as water) through the components of the shower system 10, 10', 10" will now be described.

In the illustrated embodiments of FIGS. **1-25*d*, fluid (such as water) flows through the components of the shower system 10, 10', 10"** as follows:

1. Water supply connector 16, 16', 16";
2. Dock connector 20, 20', 20";
3. Shower device connector 84, 84', 84"; and
4. Shower device discharge opening 90, 90', 90".

More specifically, in the illustrated embodiments of FIGS. **1-25*d*, fluid (such as water) flows through the components of the shower system 10, 10', 10"** as follows:

1. Water supply connector 16, 16', 16";
2. Dock fluidic connector 38, 38', 38";
3. Shower device fluidic connector 98, 98', 98"; and
4. Shower device discharge opening 90, 90', 90".

Even more specifically, in the illustrated embodiments of FIGS. 1-10, 13-15, 18-21, and **24*a*-25*d*, fluid (such as water) flows through the components of the shower system 10** as follows:

1. Ball 22, ball seal 24, ball seal platform 26, and ball retainer 30;
2. First portion of quick connect coupling 50;
3. Second portion of quick connect coupling 108;
4. Showerhead engine 88; and
5. Showerhead sprayface 90.

A quick connect coupling with a locking mechanism is disclosed in U.S. Pat. No. 8,764,068, assigned to Fortune Brands Water Innovations LLC, the entire disclosure of which is hereby incorporated by reference.

The use of the shower system 10, 10', 10" will now be described. When it is desired to attach the shower device 14, 14', 14" to the dock 12, 12', 12", the shower device 14, 14', 14" is moved toward the dock 12, 12', 12".

In the illustrated embodiments of FIGS. **1-25*d*, as the shower device 14, 14', 14" is moved toward the dock 12, 12', 12"**, the following steps occur:

1. The shower device fluidic connector 98, 98', 98" is aligned with the dock fluidic connector 38, 38', 38";

2. The shower device alignment mechanism 102, 102', 102" is aligned with the dock alignment mechanism 44, 44', 44"; and
3. The shower device magnetic mechanism 100, 100', 100" is aligned with the dock magnetic mechanism 42, 42', 42".

More specifically, in the illustrated embodiment of FIGS. 1-10, 13-15, 18-21, and 24*a*-25*d*, as the showerhead 14 is moved toward the dock 12, the following steps occur:

1. The second portion of quick connect coupling 108 (which extends through the central opening 124 in the showerhead connector cover 104) is aligned with the first portion of quick connect coupling 50 (which extends behind the central opening 76 in the dock connector cover 46 and the central opening 74 in the dock magnet retainer 64);
2. The alignment tabs 120 extending from the second portion of quick connect coupling 108 and through the alignment slots 122 in the showerhead connector cover 104 are aligned with the alignment slots 72 in the dock connector cover 46 and the alignment slots 70 in the dock magnet retainer 64; and
3. The showerhead magnets 112 received in the openings 116 in the second portion of quick connect coupling 108 and the openings 118 in the showerhead connector cover 104 are aligned with the dock magnets 60 received in the openings 66 in the dock magnet retainer 64 and the openings 68 in the dock connector cover 46.

In the illustrated embodiments of FIGS. 1-25*d*, with these components aligned as set forth above, as the shower device 14, 14', 14" is moved further toward the dock 12, 12', 12", the following steps occur:

1. The shower device fluidic connector 98, 98', 98" starts to engage the dock fluidic connector 38, 38', 38";
2. The shower device alignment mechanism 102, 102', 102" starts to engage the dock alignment mechanism 44, 44', 44";
3. The shower device magnetic mechanism 100, 100', 100" interacts with the dock magnetic mechanism 42, 42', 42";
4. The shower device fluidic connector 98, 98', 98" sealingly engages the dock fluidic connector 38, 38', 38";
5. The locking mechanism 40, 40', 40" engages the showerhead fluidic connector 98, 98', 98"; and
6. The shower device alignment mechanism 102, 102', 102" fully engages the dock alignment mechanism 44, 44', 44".

More specifically, in the illustrated embodiment of FIGS. 1-10, 13-15, 18-21, and 24*a*-25*d*, with these components aligned as set forth above, as the showerhead 14 is moved further toward the dock 12, the following steps occur:

1. The second portion of quick connect coupling 108 starts to engage the first portion of quick connect coupling 50;
2. The alignment tabs 120 extending from the second portion of quick connect coupling 108 and through the alignment slots 122 in the showerhead connector cover 104 start to engage the alignment slots 72 in the dock connector cover 46 and the alignment slots 70 in the dock magnet retainer 64;
3. The magnetic field produced by the showerhead magnets 112 received in the openings 116 in the second portion of quick connect coupling 108 and the openings 118 in the showerhead connector cover 104 interacts with the magnetic field produced by the dock magnets 60 received in the openings 66 in the dock magnet retainer 64 and the openings 68 in the dock connector cover 46;
4. The second portion of quick connect coupling 108 sealingly engages the first portion of quick connect coupling 50;
5. The push button lock 52 engages the second portion of quick connect coupling 108;
6. The alignment tabs 120 extending from the second portion of quick connect coupling 108 and through the alignment slots 122 in the showerhead connector cover 104 fully engage the alignment slots 72 in the dock connector cover 46 and the alignment slots 70 in the dock magnet retainer 64; and
7. The showerhead connector cover 104 engages the dock connector cover 46.

In an exemplary embodiment, step 2 of 6 occurs before step 3 of 6, i.e., the shower device alignment mechanism 102, 102', 102" starts to engage the dock alignment mechanism 44, 44', 44" before the shower device magnetic mechanism 100, 100', 100" interacts with the dock magnetic mechanism 42, 42', 42". More specifically, step 2 of 7 occurs before step 3 of 7, i.e., the alignment tabs 120 extending from the second portion of quick connect coupling 108 and through the alignment slots 122 in the showerhead connector cover 104 start to engage the alignment slots 72 in the dock connector cover 46 and the alignment slots 70 in the dock magnet retainer 64 before the magnetic field produced by the showerhead magnets 112 received in the openings 116 in the second portion of quick connect coupling 108 and the openings 118 in the showerhead connector cover 104 interacts with the magnetic field produced by the dock magnets 60 received in the openings 66 in the dock magnet retainer 64 and the openings 68 in the dock connector cover 46.

In an exemplary embodiment, step 3 of 6 occurs before step 4 of 6, i.e., the shower device magnetic mechanism 100, 100', 100" interacts with the dock magnetic mechanism 42, 42', 42" before the shower device fluidic connector 98, 98', 98" sealingly engages the dock fluidic connector 38, 38', 38". More specifically, step 3 of 7 occurs before step 4 of 7, i.e., the magnetic field produced by the showerhead magnets 112 received in the openings 116 in the second portion of quick connect coupling 108 and the openings 118 in the showerhead connector cover 104 interacts with the magnetic field produced by the dock magnets 60 received in the openings 66 in the dock magnet retainer 64 and the openings 68 in the dock connector cover 46 before the second portion of quick connect 108 coupling sealingly engages the first portion of quick connect coupling 50.

In an exemplary embodiment, step 2 of 6 occurs before step 4 of 6, i.e., the shower device alignment mechanism 102, 102', 102" starts to engage the dock alignment mechanism 44 before the shower device fluidic connector 98, 98', 98" sealingly engages the dock fluidic connector 38. More specifically, step 2 of 7 occurs before step 4 of 7, i.e., the alignment tabs 120 extending from the second portion of quick connect coupling 108 and through the alignment slots 122 in the showerhead connector cover 104 start to engage the alignment slots 72 in the dock connector cover 46 and the alignment slots 70 in the dock magnet retainer 64 before the second portion of quick connect coupling 108 sealingly engages the first portion of quick connect coupling 50.

In an exemplary embodiment, step 4 of 6 occurs before step 5 of 6, i.e., the shower device fluidic connector 98, 98', 98" sealingly engages the dock fluidic connector 38, 38', 38" before the locking mechanism 40, 40' engages the shower device fluidic connector 98, 98' or the locking mechanism 40" engages the dock fluidic connector 98". More specifically, step 4 of 7 occurs before step 5 of 7, i.e., the second portion of quick connect coupling 108 sealingly engages the first portion of quick connect coupling 50 before the push button lock 52 engages the second portion of quick connect coupling 108.

While the shower system 10, 10', 10" has been shown and described in the illustrated embodiments as including certain components, one of ordinary skill in the art will appreciate that the shower system 10, 10', 10" does not need to include each of these components.

As an example, in the illustrated embodiments, the dock connector 20, 20', 20" includes the dock fluidic connector, 38, 38', 38", the locking mechanism 40, 40', the dock magnetic mechanism 42, 42', 42", the dock alignment mechanism 44, 44', 44", and the dock connector cover 46. However, one of ordinary skill in the art will appreciate that the dock connector 20, 20', 20" could not include one or more of these components.

Similarly, in the illustrated embodiments, the dock fluidic connector 38, 38', 38", the locking mechanism 40, 40', the dock magnetic mechanism 42, 42', 42", the dock alignment mechanism 44, 44', 44", and the dock connector cover 46 of the dock connector 20, 20', 20" are separate components. However, one of ordinary skill in the art will appreciate that one or more of these components could be integrated.

As another example, in the illustrated embodiments, the shower device connector 84, 84', 84" includes the shower device fluidic connector 98, 98', 98", the locking mechanism 40", the shower device magnetic mechanism 100, 100', 100", the shower device alignment mechanism 102, 102', 102", and the showerhead connector cover 104. However, one of ordinary skill in the art will appreciate that the shower device connector 84, 84', 84" could not include one or more of these components.

Similarly, in the illustrated embodiments, the shower device fluidic connector 98, 98', 98", the locking mechanism 40", the shower device magnetic mechanism 100, 100', 100", the shower device alignment mechanism 102, 102', 102", and the showerhead connector cover 104 of the showerhead connector 84, 84', 84" are separate components. However, one of ordinary skill in the art will appreciate that one or more of these components could be integrated.

As another example, in the illustrated embodiment, the water supply connector 16 includes a ball 22. However, one of ordinary skill in the art will appreciate that the water supply connector 16 could include other types of connectors.

As another example, in the illustrated embodiment, the dock fluidic connector 38 includes the first (such as female) portion of quick connect coupling 50, and the showerhead fluidic connector 98 includes the second (such as male) portion of quick connect coupling 108. However, one of ordinary skill in the art will appreciate that the dock fluidic connector 38 and the showerhead fluidic connector 98 could include other types of fluidic connectors.

As another example, in the illustrated embodiment, the locking mechanism 40 includes the push button lock 52. However, one of ordinary skill in the art will appreciate that the locking mechanism 40 could include other types of locks. In exemplary embodiments, the locking mechanism 40, 40', 40" includes any type of lock that is operable to removably retain the shower device/showerhead 14, 14', 14" in sealing engagement with the dock 12, 12', 12" and, more specifically, the shower device/showerhead fluidic connector 98, 98', 98" in sealing engagement with the dock fluidic connector 38, 38', 38". Other exemplary locks include, but are not limited to, quarter-turn and bayonet. In exemplary embodiments, the locking mechanism 40, 40', 40" includes a non-threaded lock.

As another example, in the illustrated embodiment, the dock magnetic mechanism 42 incudes the dock magnet covers 62, and the showerhead magnetic mechanism 100 includes the showerhead magnet covers 114. However, one of ordinary skill in the art will appreciate that the dock magnetic mechanism 42 could not include the dock magnet covers 62, and the showerhead magnetic mechanism 100 could not include the showerhead magnet covers 114.

As another example, in the illustrated embodiment, the dock alignment mechanism 44 includes the alignment slots 70 extending in the dock magnet retainer 64 and the alignment slots 72 extending in the dock connector cover 46, and the showerhead alignment mechanism 102 includes the alignment tabs 120 extending from the second portion of quick connect coupling 108 and the alignment slots 122 extending in the showerhead connector cover 104. However, one of ordinary skill in the art will appreciate that the dock alignment mechanism 44 and the showerhead alignment mechanism 102 could include other types of alignment features.

While the shower system 10, 10', 10" has been shown and described in the illustrated embodiment as including components having certain features, one of ordinary skill in the art will appreciate that the shower system 10, 10', 10" could have these features on other components.

As an example, in the illustrated embodiment, the dock fluidic connector 38 includes the first (such as female) portion of quick connect coupling 50, and the showerhead fluidic connector 98 includes the second (such as male) portion of quick connect coupling 108. However, one of ordinary skill in the art will appreciate that the dock fluidic connector 38 could include the second (such as male) portion of quick connect coupling, and the showerhead fluidic connector 98 could include the first (such as female) portion of quick connect coupling.

As another example, in the illustrated embodiments, the dock connector 20, 20' includes the locking mechanism 40, 40' and the shower device connector 84" includes the locking mechanism 40". However, one of ordinary skill in the art will appreciate that the shower device/showerhead connector 84, 84' could include the locking mechanism 40, 40' and the dock connector 20" could include the locking mechanism 40". Alternatively, one of ordinary skill in the art will appreciate that the shower device/showerhead connector 84, 84', 84" could include a first portion of the locking mechanism 40, 40', 40" and the dock connector 20, 20', 20" could include a second portion of the locking mechanism 40, 40', 40".

As another example, in the illustrated embodiment, the locking mechanism 40 engages the first (such as female) portion of quick connect coupling 50. However, one of ordinary skill in the art will appreciate that the locking mechanism 40 could engage another component of the shower system 10. In exemplary embodiments, the locking mechanism 40, 40', 40" is operable to engage any component(s) of the shower system 10, 10', 10" and enable the shower device/showerhead 14, 14', 14" to be removably retained in sealing engagement with the dock 12, 12', 12" and, more specifically, the shower device/showerhead fluidic connector 98, 98', 98" to be removably retained in sealing engagement with the dock fluidic connector 38, 38', 38".

As another example, in the illustrated embodiment, the dock alignment mechanism 44 includes the alignment slots 70 extending in the dock magnet retainer 64 and the alignment slots 72 extending in the dock connector cover 46, and the showerhead alignment mechanism 102 includes the alignment tabs 120 extending from the second portion of quick connect coupling 108 and the alignment slots 122 extending in the showerhead connector cover 104. However, one of ordinary skill in the art will appreciate that the dock alignment mechanism 44 could include the alignment tabs and the alignment slots, and the showerhead alignment mechanism 102 could include the alignment slots.

As another example, in the illustrated embodiment, the dock connector cover 46 includes the alignment slots 72 and the dock magnet retainer 64 include the alignment slots 70, and the second portion of quick connect coupling 108 includes the alignment tabs 120 and the showerhead connector cover 104 incudes the alignment slots 122. However, one of ordinary skill in the art will appreciate that other portions of the dock connector 20 could include the alignment slots, and other portions of the showerhead connector 84 could include the alignment tabs and the alignment slots.

While the shower system 10, 10', 10" has been shown and described in the illustrated embodiment as including components having certain shapes, sizes, numbers, and configurations and made of certain materials, one of ordinary skill in the art will appreciate that the components of the shower system 10, 10', 10" do not need to have these shapes, sizes, numbers, and configurations and be made of these materials.

As an example, in the illustrated embodiment, the dock magnets 60 of the dock magnetic mechanism 42 and the showerhead magnets 112 of the showerhead magnetic mechanism 100 are generally cylindrical shaped. However, one of ordinary skill in the art will appreciate that the dock magnets 60 of the dock magnetic mechanism 42 and the showerhead magnets 112 of the showerhead magnetic mechanism 100 could have other shapes.

As another example, in the illustrated embodiment, the dock magnetic mechanism 42 includes two (2) dock magnet gaskets 58, two (2) dock magnets 60, and two (2) dock magnet covers 62, and the showerhead magnetic mechanism 100 includes two (2) showerhead magnet gaskets 110, two (2) showerhead magnets 112, and two (2) showerhead magnet covers 114. However, one of ordinary skill in the art will appreciate that the dock magnetic mechanism 42 and the showerhead magnetic mechanism 100 could include less or more of each of these components.

As another example, in the illustrated embodiment, the dock magnetic mechanism 42 includes dock magnets 60, and the showerhead magnetic mechanism 100 includes showerhead magnets 112. However, one of ordinary skill in the art will appreciate that one of the dock magnetic mechanism 42 and the showerhead magnetic mechanism 100 could include a magnetically attractable material instead of magnets.

As another example, in the illustrated embodiment, the alignment slots 70, 72 of the dock alignment mechanism 44 (more specifically, the alignment slots 70 extending in the dock magnet retainer 64 and the alignment slots 72 extending in the dock connector cover 46) and the alignment tabs 120 and the alignment slots 122 of the showerhead alignment mechanism 102 (more specifically, the alignment tabs 120 extending from the second portion of quick connect coupling 108 and the alignment slots 122 extending in the showerhead connector cover 104) are generally curved. However, one of ordinary skill in the art will appreciate that the alignment slots 70, 72 of the dock alignment mechanism 44 and the alignment tabs 120 and the alignment slots 122 of the showerhead alignment mechanism 102 could have other shapes, so long as the shape of the alignment slots 70, 72 of the dock alignment mechanism 44 and the shape of the alignment tabs 120 and the alignment slots 122 of the showerhead alignment mechanism 102 enable these components to engage with each other.

As another example, in the illustrated embodiment, the alignment slots 70, 72 of the dock alignment mechanism 44 (more specifically, the alignment slots 70 extending in the dock magnet retainer 64 and the alignment slots 72 extending in the dock connector cover 46) and the alignment tabs 120 and the alignment slots 122 of the showerhead alignment mechanism 102 (more specifically, the alignment tabs 120 extending from the second portion of quick connect coupling 108 and the alignment slots 122 extending in the showerhead connector cover 104) have a certain size. However, one of ordinary skill in the art will appreciate that the alignment slots 70, 72 of the dock alignment mechanism 44 and the alignment tabs 120 and the alignment slots 122 of the showerhead alignment mechanism 102 could be smaller or larger, so long as the size of the alignment slots 70, 72 of the dock alignment mechanism 44 and the size of the alignment tabs 120 and the alignment slots 122 of the showerhead alignment mechanism 102 enable these components to engage with each other.

As another example, in the illustrated embodiment, the dock alignment mechanism 44 includes two (2) alignment slots 70 extending in the dock connector cover 46 and two (2) alignment slots 72 extending in the dock magnet retainer 64, and the showerhead alignment mechanism 102 includes two (2) alignment tabs 120 extending from the second portion of quick connect coupling 108 and two (2) alignment slots 122 extending in the showerhead connector cover. However, one of ordinary skill in the art will appreciate that the dock alignment mechanism 44 and the showerhead alignment mechanism 102 could include less or more of each of these components.

While the shower system 10, 10', 10" has been shown and described in the illustrated embodiment with the components of the shower system 10, 10', 10" attached and used in a particular manner, one of ordinary skill in the art will appreciate that the components of the shower system 10, 10', 10" do not need to be attached and used in this manner.

As an example, in the illustrated embodiments, the connection of the shower device 14, 14', 14" to the dock 12, 12', 12" includes a number of steps that occur in the order listed above. However, one of ordinary skill in the art will appreciate that these steps could occur in other orders. For example, the shower device fluidic connector 98, 98', 98" may not sealingly engage the dock fluidic connector 38, 38', 38" until all the other steps have occurred.

As another example, in the illustrated embodiments, the water supply connector 16, 16', 16" of the dock 12, 12', 12" can be used to attach the dock 12, 12', 12" to the water supply pipe S (such as the shower arm extending from the wall). However, one of ordinary skill in the art will appreciate that the dock 12, 12', 12" could be attached to any surface or any component of a plumbing system (generically referred to as a water supply pipe S) to which the dock 12, 12', 12" can be attached and from which the dock 12, 12', 12" can receive fluid from a water supply.

Exemplary embodiments of the shower system enable the shower device to be easily removed from the dock. These exemplary embodiments provide the following features, either alone or in combination:

1. When the shower device is removed from the dock, the dock remains attached to the water supply pipe (such as the shower arm).

2. When the dock is attached to the water supply pipe (such as the shower arm), regardless of whether the shower device is attached to the dock, the dock can be moved relative to the water supply pipe. The dock can be moved to multiple positions (such as the first position shown in FIG. 3 and the second position shown in FIG. 4).
3. When the shower device is attached to the dock, the locking mechanism retains the shower device in sealing engagement with the dock.
4. The locking mechanism does not require an additional action (other than moving the shower device into sealing engagement with the dock) to engage the locking mechanism.
5. The locking mechanism requires a specific action to disengage the locking mechanism (such as pressing the push button lock).
6. The interaction of the shower device magnetic mechanism and the dock magnetic mechanism is sufficient to retain the shower device attached to the dock, even if the locking mechanism is accidentally disengaged or is not effective.
7. The engagement of the shower device alignment mechanism and the dock alignment mechanism resists rotation of the shower device relative to the dock.

One of ordinary skill in the art will now appreciate that the present invention provides a shower system that enables a shower device to be easily removed from a dock. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A shower system, comprising:

a dock, the dock including a water supply connector, a dock housing, and a dock connector, the dock connector including a dock fluidic connector, the dock fluidic connector including a dock fluid passageway, the dock connector further including a dock magnetic mechanism and a dock align member;

a shower device, the shower device including a shower device housing and a shower device connector, the shower device connector including a shower device fluidic connector, the shower device fluidic connector including a shower device fluid passageway, the shower device connector further including a shower device magnetic mechanism and a shower device align member; and a lock;

wherein the water supply connector is operable to sealingly engage a water supply pipe;

wherein the shower device fluidic connector is operable to sealingly engage the dock fluidic connector and enable fluid to flow from the dock fluid passageway to the shower device fluid passageway;

wherein the lock is operable to removably retain the shower device fluidic connector in sealing engagement with the dock fluidic connector;

wherein the shower device magnetic mechanism is operable to interact with the dock magnetic mechanism;

wherein the shower device align member is operable to engage with the dock align member; and wherein the shower device magnetic mechanism interacts with the dock magnetic mechanism before the shower device fluidic connector sealingly engages the dock fluidic connector.

2. The shower system of claim 1, wherein the shower device fluidic connector sealingly engages the dock fluidic connector before the lock retains the shower device fluidic connector in sealing engagement with the dock fluidic connector.

3. The shower system of claim 1, wherein the shower device align member engages the dock align member before the shower device magnetic mechanism interacts with the dock magnetic mechanism.

4. The shower system of claim 1, wherein one of the dock magnetic mechanism and the shower device magnetic mechanism includes a magnet and the other of the dock magnetic mechanism and the shower device magnetic mechanism includes one of a magnet and a magnetically attractive material.

5. The shower system of claim 1, wherein one of the dock align member and the shower device align member is a tab and the other of the dock align member and the shower device align member is a slot.

6. The shower system of claim 1, wherein the lock is a push button lock.

7. The shower system of claim 1, wherein the water supply pipe is a shower arm.

8. A shower system, comprising:

a dock, the dock including a water supply connector, a dock housing, and a dock connector, the dock connector including a dock fluidic connector, the dock fluidic connector including a dock fluid passageway, the dock connector further including a dock magnetic mechanism and a dock align member;

a shower device, the shower device including a shower device housing and a shower device connector, the shower device connector including a shower device fluidic connector, the shower device fluidic connector including a shower device fluid passageway, the shower device connector further including a shower device magnetic mechanism and a shower device align member; and a lock;

wherein the water supply connector is operable to sealingly engage a water supply pipe;

wherein the shower device fluidic connector is operable to sealingly engage the dock fluidic connector and enable fluid to flow from the dock fluid passageway to the shower device fluid passageway;

wherein the lock is operable to removably retain the shower device fluidic connector in sealing engagement with the dock fluidic connector;

wherein the shower device magnetic mechanism is operable to interact with the dock magnetic mechanism;

wherein the shower device align member is operable to engage with the dock align member; and wherein the shower device align member engages the dock align member before the shower device fluidic connector sealingly engages the dock fluidic connector.

9. The shower system of claim 8, wherein the shower device fluidic connector sealingly engages the dock fluidic connector before the lock retains the shower device fluidic connector in sealing engagement with the dock fluidic connector.

10. The shower system of claim 8, wherein the shower device align member engages the dock align member before the shower device magnetic mechanism interacts with the dock magnetic mechanism.

11. The shower system of claim 8, wherein one of the dock magnetic mechanism and the shower device magnetic mechanism includes a magnet and the other of the dock magnetic mechanism and the shower device magnetic mechanism includes one of a magnet and a magnetically attractive material.

12. The shower system of claim 8, wherein one of the dock align member and the shower device align member is a tab and the other of the dock align member and the shower device align member is a slot.

13. The shower system of claim 8, wherein the lock is a push button lock.

14. The shower system of claim 8, wherein the water supply pipe is a shower arm.

15. A shower system, comprising:

a dock, the dock including a water supply connector, a dock housing, and a dock connector, the dock connector including a dock fluidic connector, the dock fluidic connector including a dock fluid passageway, the dock connector further including a dock magnetic mechanism and a dock align member;

a shower device, the shower device including a shower device housing and a shower device connector, the shower device connector including a shower device fluidic connector, the shower device fluidic connector including a shower device fluid passageway, the shower device connector further including a shower device magnetic mechanism and a shower device align member; and a lock;

wherein the water supply connector is operable to sealingly engage a water supply pipe;

wherein the shower device fluidic connector is operable to sealingly engage the dock fluidic connector and enable fluid to flow from the dock fluid passageway to the shower device fluid passageway;

wherein the lock is operable to removably retain the shower device fluidic connector in sealing engagement with the dock fluidic connector;

wherein the shower device magnetic mechanism is operable to interact with the dock magnetic mechanism;

wherein the shower device align member is operable to engage with the dock align member;

wherein the shower device magnetic mechanism interacts with the dock magnetic mechanism before the shower device fluidic connector sealingly engages the dock fluidic connector; and wherein the shower device align member engages the dock align member before the shower device fluidic connector sealingly engages the dock fluidic connector.

16. The shower system of claim 15, wherein the shower device fluidic connector sealingly engages the dock fluidic connector before the lock retains the shower device fluidic connector in sealing engagement with the dock fluidic connector.

17. The shower system of claim 15, wherein the shower device align member engages the dock align member before the shower device magnetic mechanism interacts with the dock magnetic mechanism.

18. The shower system of claim 15, wherein one of the dock magnetic mechanism and the shower device magnetic mechanism includes a magnet and the other of the dock magnetic mechanism and the shower device magnetic mechanism includes one of a magnet and a magnetically attractive material.

19. The shower system of claim 15, wherein one of the dock align member and the shower device align member is a tab and the other of the dock align member and the shower device align member is a slot.

20. The shower system of claim 15, wherein the lock is a push button lock.

* * * * *